US011190684B2

(12) United States Patent
Seto

(10) Patent No.: US 11,190,684 B2
(45) Date of Patent: Nov. 30, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takamasa Seto, Ebina (JP)

(73) Assignee: Canon Kabushiki Kaisha, Tokyo (JP)

(*) Notice: Subject to any disclaimer, the term of this patent is extended or adjusted under 35 U.S.C. 154(b) by 152 days.

(21) Appl. No.: 16/358,308

(22) Filed: Mar. 19, 2019

(65) Prior Publication Data
US 2019/0306415 A1 Oct. 3, 2019

(30) Foreign Application Priority Data

Mar. 30, 2018 (JP) .............................. JP2018-066927
Dec. 7, 2018 (JP) .............................. JP2018-230315

(51) Int. Cl.
G06K 9/00 (2006.01)
H04N 5/232 (2006.01)
G06T 7/73 (2017.01)
G06K 7/14 (2006.01)

(52) U.S. Cl.
CPC ....... H04N 5/23229 (2013.01); G06K 7/1417 (2013.01); G06K 7/1443 (2013.01); G06T 7/73 (2017.01)

(58) Field of Classification Search
CPC ...... G06K 7/1417; G06K 7/1443; G06T 7/73; G06T 7/30156; G06T 2207/30208; G06T 7/529; H04N 5/23229; H04N 5/23206; G01B 11/24
See application file for complete search history.

(56) References Cited

U.S. PATENT DOCUMENTS

| 7,526,122 | B2 * | 4/2009 | Usuda | G06F 3/002 |
| | | | | 382/159 |
| 2009/0171622 | A1 * | 7/2009 | Oue | B62D 65/005 |
| | | | | 702/167 |
| 2017/0151671 | A1 * | 6/2017 | Ishige | B25J 9/1697 |
| 2020/0204714 | A1 * | 6/2020 | Takayama | H04N 5/2256 |

FOREIGN PATENT DOCUMENTS

JP 2014-229274 A 12/2014

* cited by examiner

Primary Examiner — Tom Y Lu
(74) Attorney, Agent, or Firm — Canon U.S.A., Inc. IP Division

(57) ABSTRACT

An image processing apparatus that generates image data for forming a marker to be arranged on a surface of an object on a base material includes a determination unit configured to determine, based on information about a curvature of the surface of the object, an interval between a plurality of marks, in the marker, including a feature representing a shape of the surface of the object, and a generation unit configured to generate the image data based on the interval between the marks determined by the determination unit.

9 Claims, 21 Drawing Sheets

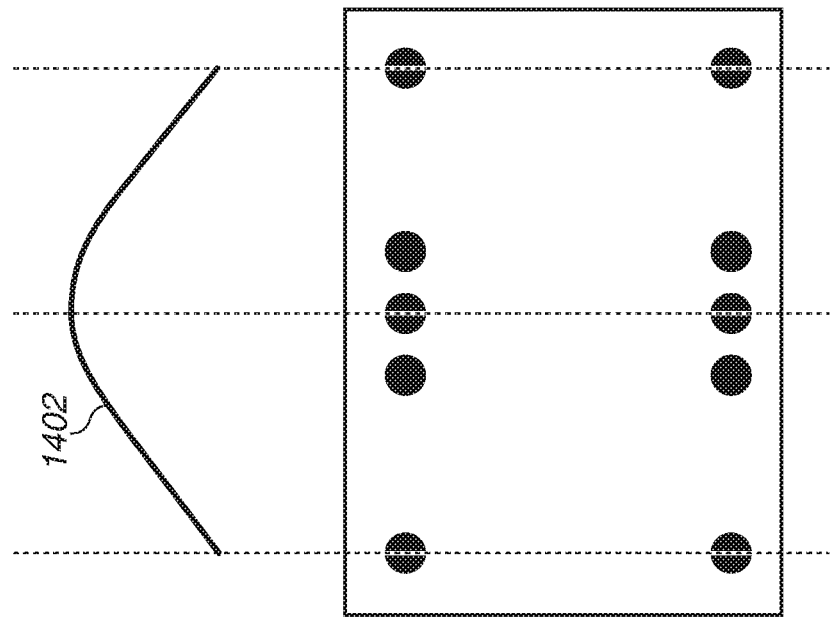
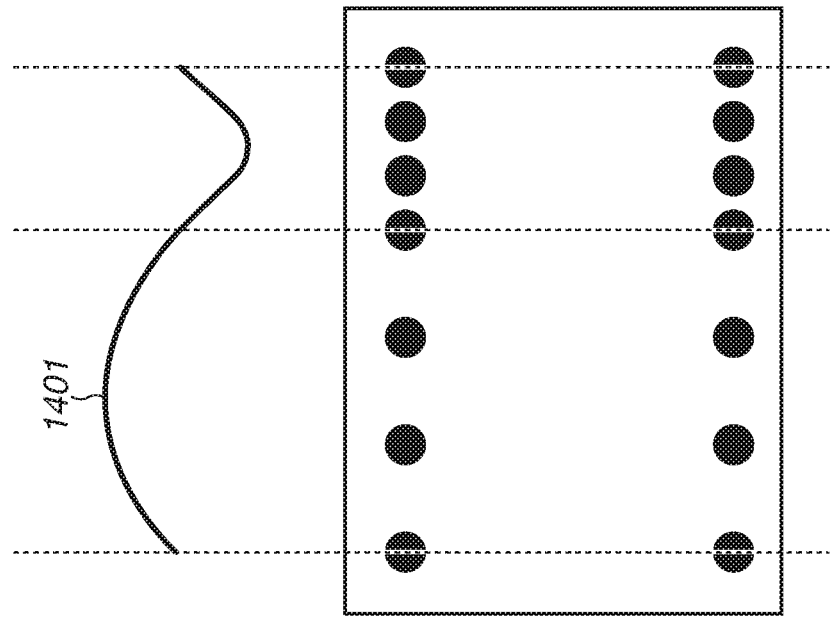

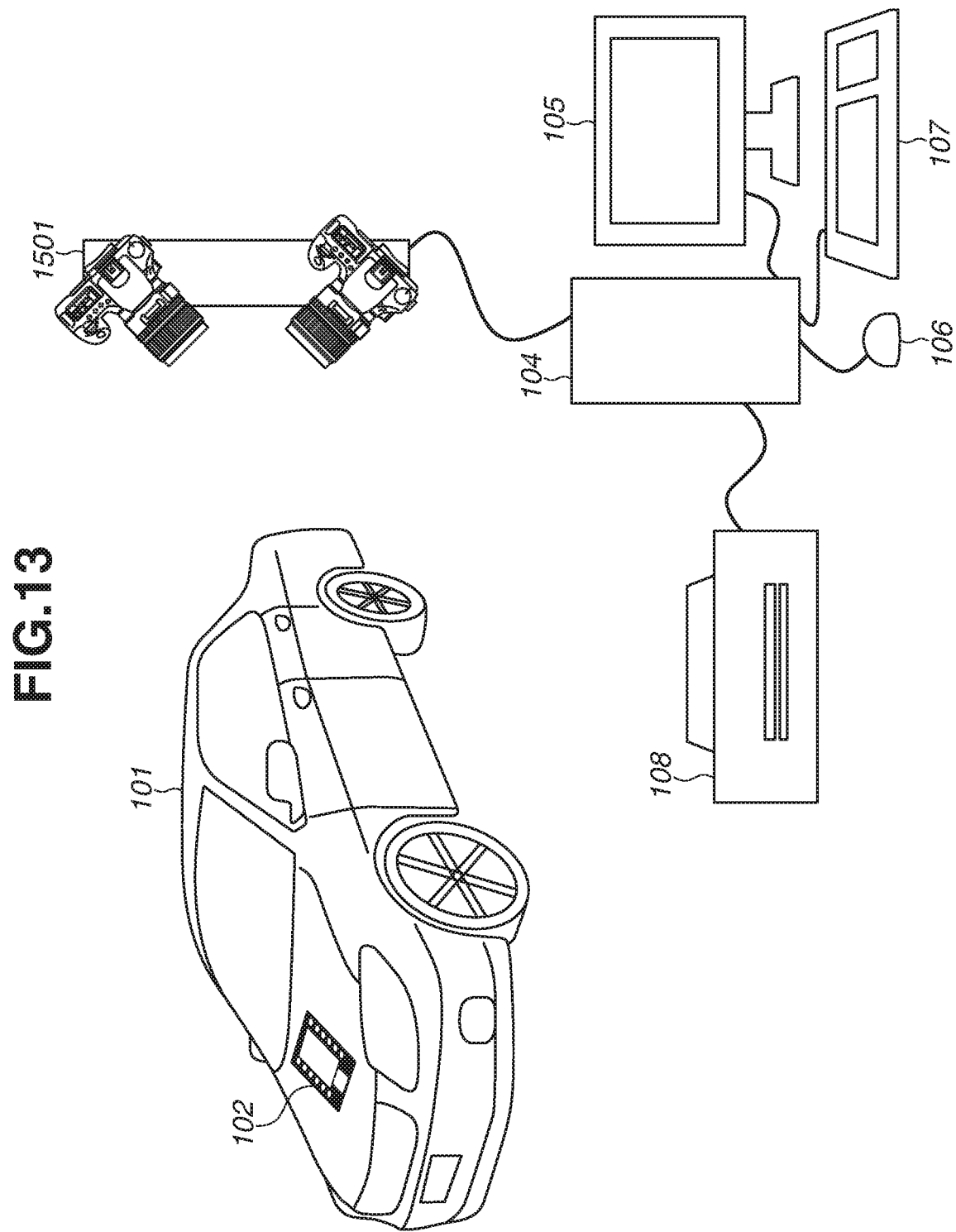

FIG.17A

MARKER REGISTRATION/PRINTING/DELETION — 1901

| SELECT | ID | COMMENT | MINIMUM CURVATURE RADIUS X | Y | SIZE | DATE AND TIME OF CREATION |
|---|---|---|---|---|---|---|
| | 1 | VEHICLE TYPE XX01_FOR PAINT SAMPLE | xx | xx | A4 | 20xx/x/x |
| ✓ | 2 | VEHICLE TYPE XX01_FOR FENDER | xx | xx | A4 | 20xx/x/x |
| | 3 | VEHICLE TYPE XX01_FOR BONNET | xx | xx | A4 | 20xx/x/x |
| | · | · | · | · | · | · |
| | · | · | · | · | · | · |
| | · | · | · | · | · | · |
| | · | · | · | · | · | · |
| | · | · | · | · | · | · |

1902

[PRINT] 1903  [SEARCH] 1904  [CANCEL] 1905

FIG.17B

NEW MARKER REGISTRATION — 2101

- PRINT SIZE: ~702
- MINIMUM CURVATURE RADIUS X[m]: ~703
- MINIMUM CURVATURE RADIUS Y[m]: ~704
- POSITION OF ID CODE: ~705

[SEARCH] ~2102

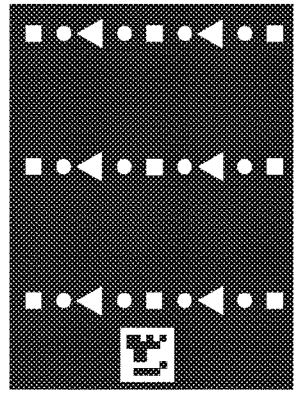
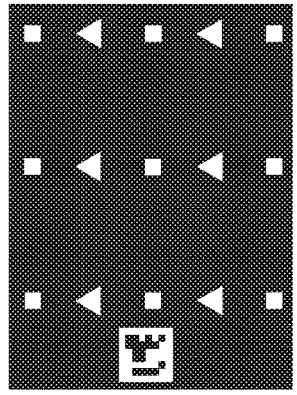
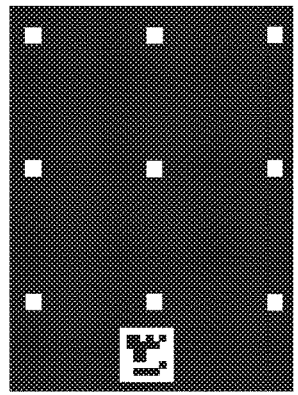
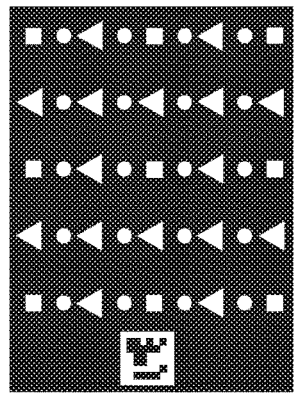
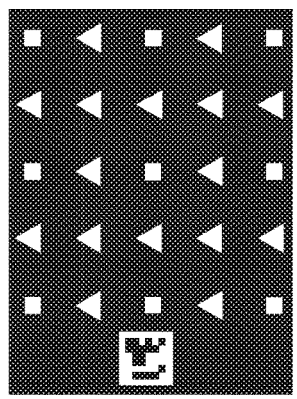
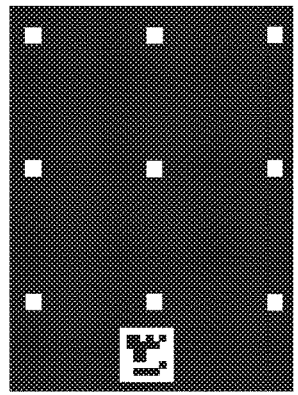
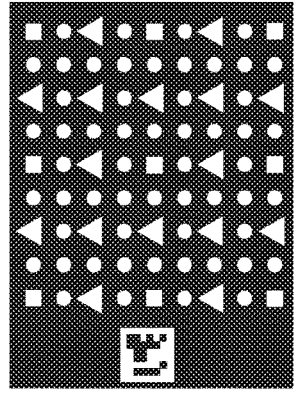
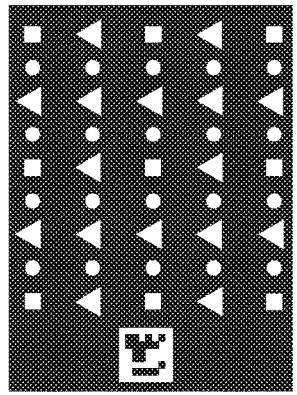
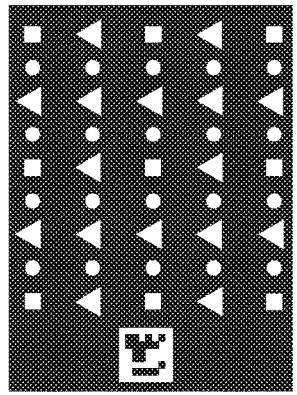

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus, an image processing method, a storage medium, and an image processing technique for acquiring a shape of an object.

Description of the Related Art

A technique has been provided in which a feature from a captured image obtained by a camera is extracted and a shape of an object is obtained based on the extracted feature. Japanese Patent Application Laid-Open No. 2014-229274 discusses a technique in which a marker including a group of points arranged therein is attached to an object and the group of points is extracted as features from an image obtained by an image of the object being captured, to thereby calculate a curvature or gradient of the object.

However, in a typical method of acquiring a shape of an object as discussed in, for example, Japanese Patent Application Laid-Open No. 2014-229274, an interval between features extracted to acquire the shape of the object may be set inappropriately.

SUMMARY

The present disclosure is directed to providing image processing for extracting a feature from a captured image at an interval appropriate for acquiring a shape of an object.

According to one or more aspects of the present disclosure, an image processing apparatus that generates image data for forming a marker to be arranged on a surface of an object on a base material includes a determination unit configured to determine, based on information about a curvature of the surface of the object, an interval between a plurality of marks, in the marker, including a feature representing a shape of the surface of the object in the marker, and a generation unit configured to generate the image data based on the interval between the marks determined by the determination unit.

Further features of the present disclosure will become apparent from the following description of exemplary embodiments with reference to the attached drawings.

BRIEF DESCRIPTION OF THE DRAWINGS

FIG. 10 illustrates an example of shape data.

FIGS. 12A and 12B are diagrams used to explain a method for determining an arrangement of mark regions.

FIG. 13 illustrates the configuration of the image processing system.

FIGS. 17A and 17B illustrate examples of the user interface.

FIGS. 20A to 20I illustrate examples of the marker.

DESCRIPTION OF THE EMBODIMENTS

Various exemplary embodiments, aspects, and features of the present disclosure will be described below with reference to the accompanying drawings. The following exemplary embodiments are not intended to be limiting the present disclosure in any way. Not all combinations of features described in configurations of the exemplary embodiments are essential for the present disclosure.

A first exemplary embodiment of the present disclosure will be described below in detail. In the present exemplary embodiment, a shape of a three-dimensional object is acquired. The three-dimensional object used in the present exemplary embodiment is a vehicle body having a curved surface shape.

<Configuration of Image Processing System>

Figure 1:
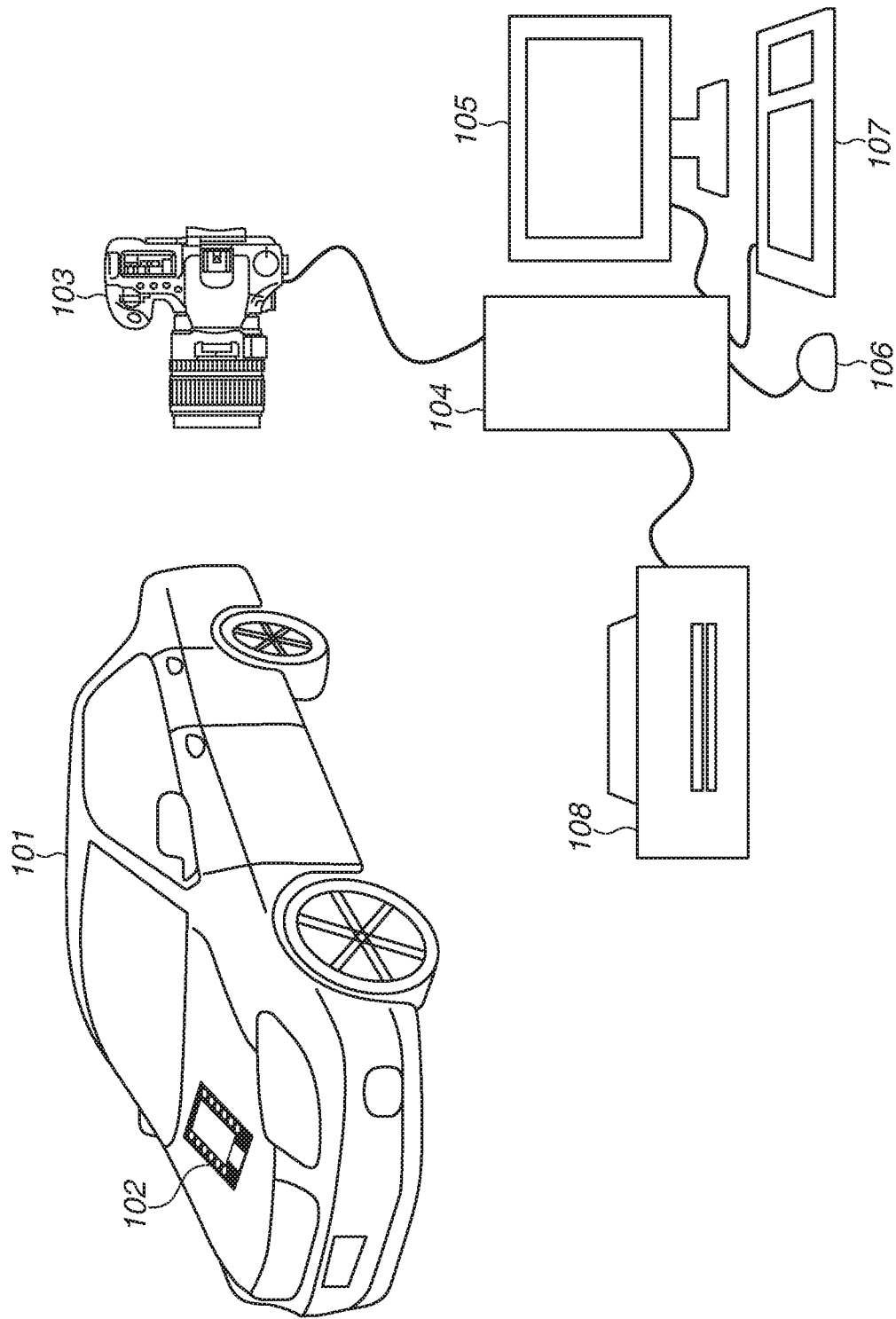
FIG. 1 illustrates a configuration of an image processing system according to an exemplary embodiment of the present disclosure.

FIG. 1 illustrates a configuration of an image processing system according to the present exemplary embodiment. The image processing system includes an image capturing apparatus 103, an image processing apparatus 104, and an image forming apparatus 108. An object 101 is a target object whose shape is to be acquired. A marker 102 is to be attached to the surface of the object 101 to acquire the shape of the object 101. The image capturing apparatus 103 is a digital camera that captures an image of the object 101 in such a manner that the marker 102 attached to the surface of the object 101 is included in an image capturing range. Examples of the object 101 used in the present exemplary embodiment include exterior or interior parts of the vehicle body which have different shapes. The object 101 is not limited to the examples described above, as long as the object 101 has a curved surface shape. The image capturing apparatus 103 includes a lens and an area sensor having 4000×2000 pixels, such as a complementary metal-oxide semiconductor (CMOS) image sensor, and generates image data representing an image having 24-bit color information, including 8-bit color information about a red (R) value, 8-bit color information about a green (G) value, and 8-bit color information about a blue (B) value, for each pixel. The image capturing apparatus 103 is not particularly limited, as long as the image capturing apparatus 103 is a camera capable of acquiring a two-dimensional distribution for color information about an image capturing target. The number of colors, bit depth, the number of pixels, and the like of the image capturing apparatus 103 are not limited to the examples described above. The image capturing apparatus 103 and the image forming apparatus 108 are each connected to the image processing apparatus 104 via an interface, such as a universal serial bus (USB). The image processing apparatus 104 is a general-purpose computer, such as a personal computer. A display 105, a mouse 106, and a keyboard 107 are also connected to the image processing apparatus 104 via an interface, such as a USB. The image forming apparatus 108 is an inkjet printer capable of printing a 600-dpi binary image (black-and-white image). The image forming apparatus 108 records a pattern of the marker 102 on a base material that can be attached to the object 101. Examples of the base material include a seal, a magnet, and an adsorptive sheet. The image forming apparatus 108 is not particularly limited, as long as the pattern of the marker 102 can be recorded on a recording medium. For example, the image forming apparatus 108 may be a printer capable of printing a color image.

<Marker 102>

Figure 4:
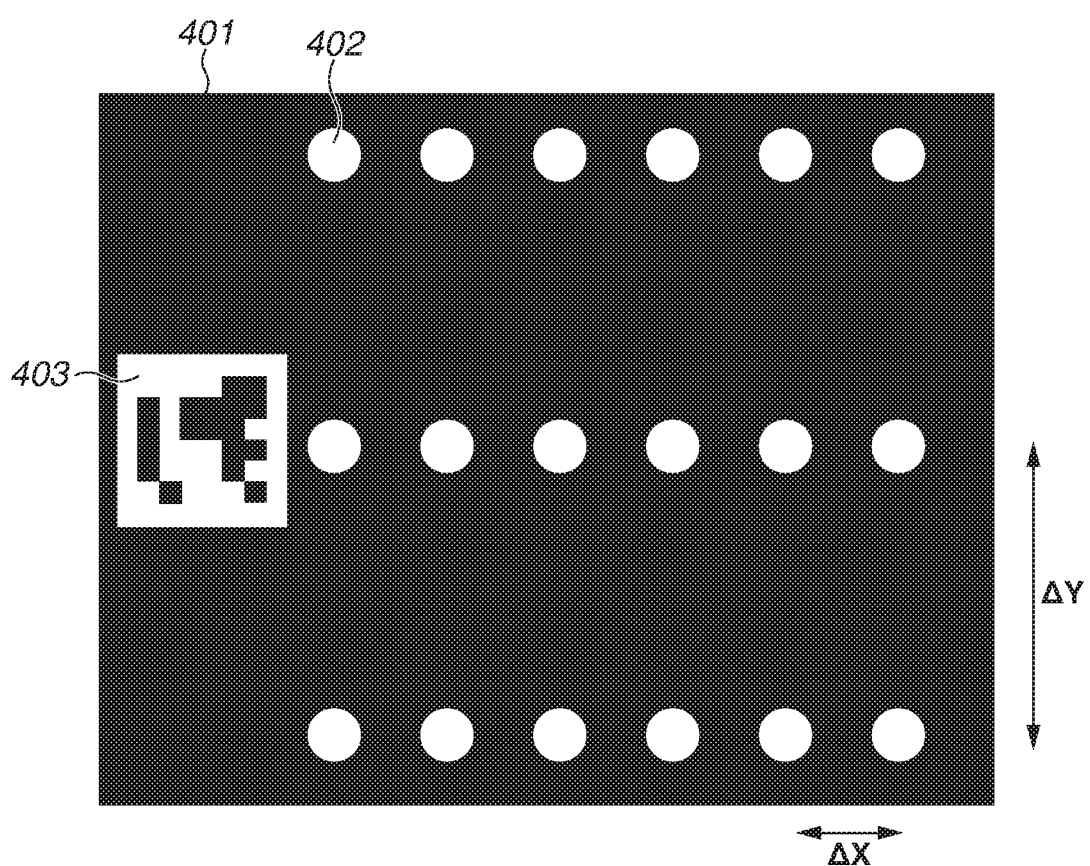
FIG. 4 illustrates an example of a marker.

Next, the marker 102 will be described in detail. FIG. 4 illustrates an example of a layout of the marker 102. A frame region 401 is a black region. Various patterns are arranged on the frame region 401. Each mark region 402 is a white circular region and is used for calculating the shape of the object 101 based on a captured image. The marker 102 includes a region including a pattern formed of a plurality of mark regions 402. Each of the plurality of mark regions 402 is used for specifying the position of one point in the object 101. At least three or more mark regions 402 are arranged on the frame region 401, and a distortion of the mark regions 402 in the captured image is specified to thereby calculate the shape of the object 101. In the marker 102 illustrated in FIG. 4, 18 mark regions 402 are provided in six rows and three columns, i.e., six mark regions 402 arranged in a lateral direction and three mark regions 402 arranged in a longitudinal direction. In a case where blurring occurs at an edge of a mark region 402 in the captured image due to, for example, the effect of the depth of field, central coordinates of the circular region can be stably calculated independently of parameters such as a threshold for binarization if the mark region 402 is a circular region. If it is desirable to capture images of, for example, an object having a curved surface, in various directions, blurring is more likely to occur in the images. Thus, it is desirable that a circular shape be used as the shape of each mark region 402. An identification (ID) code region 403 is a region in which identification information is encoded. The identification information is used to identify the marker 102, and is a number assigned based on an arrangement of the mark regions 402. The identification number is associated with information for specifying a region in the object 101, thus specifying from which area in the object 101 the shape is acquired and facilitating the management of generated shape data. As a pattern for the ID code region 403, a pattern is used that is obtained by the region being divided into 64 blocks of 8×8 pixels and is capable of expressing a 64-bit identification number with expression of each block using two values representing white and black.

Increasing a contrast for colors of the mark regions 402 with respect to the frame region 401 enables processing for extracting the mark regions 402 from the captured image to be accurately performed. Here, the color of each mark region 402 is white and the color of the frame region 401 is black. However, the colors of the regions are not limited to these colors. For example, the frame region 401 may be transparent and the color of each mark region 402 may be determined based on the color of the object 101.

The marker 102 is obtained by the above-described layout being printed on a flexible base material, which can be freely curved along the surface of the object 101, with the image forming apparatus 108. As the base material, it is desirable that a repeatedly attachable and detachable material, such as a magnet or an adsorptive sheet, be used. The use of a matte printing material having diffusive properties for a printing material, such as ink or toner used for printing, leads to a reduction in reflection of a light source or surroundings. This enables the mark regions 402 to be extracted with high accuracy. In addition, it is desirable that the marker 102 be attached to the object 101 in such a manner that the marker 102 is prevented from being wrinkled, or no gap is formed between the surface of the object 101 and the marker 102. To accurately acquire the shape of the object 101, it is desirable that the marker 102 is attached to a target region in such a manner that the mark regions 402 are densely arranged in a direction in which the curvature radius is minimized in the target region for shape acquisition.

<Hardware Configuration of Image Processing Apparatus 104>

Figure 2A:
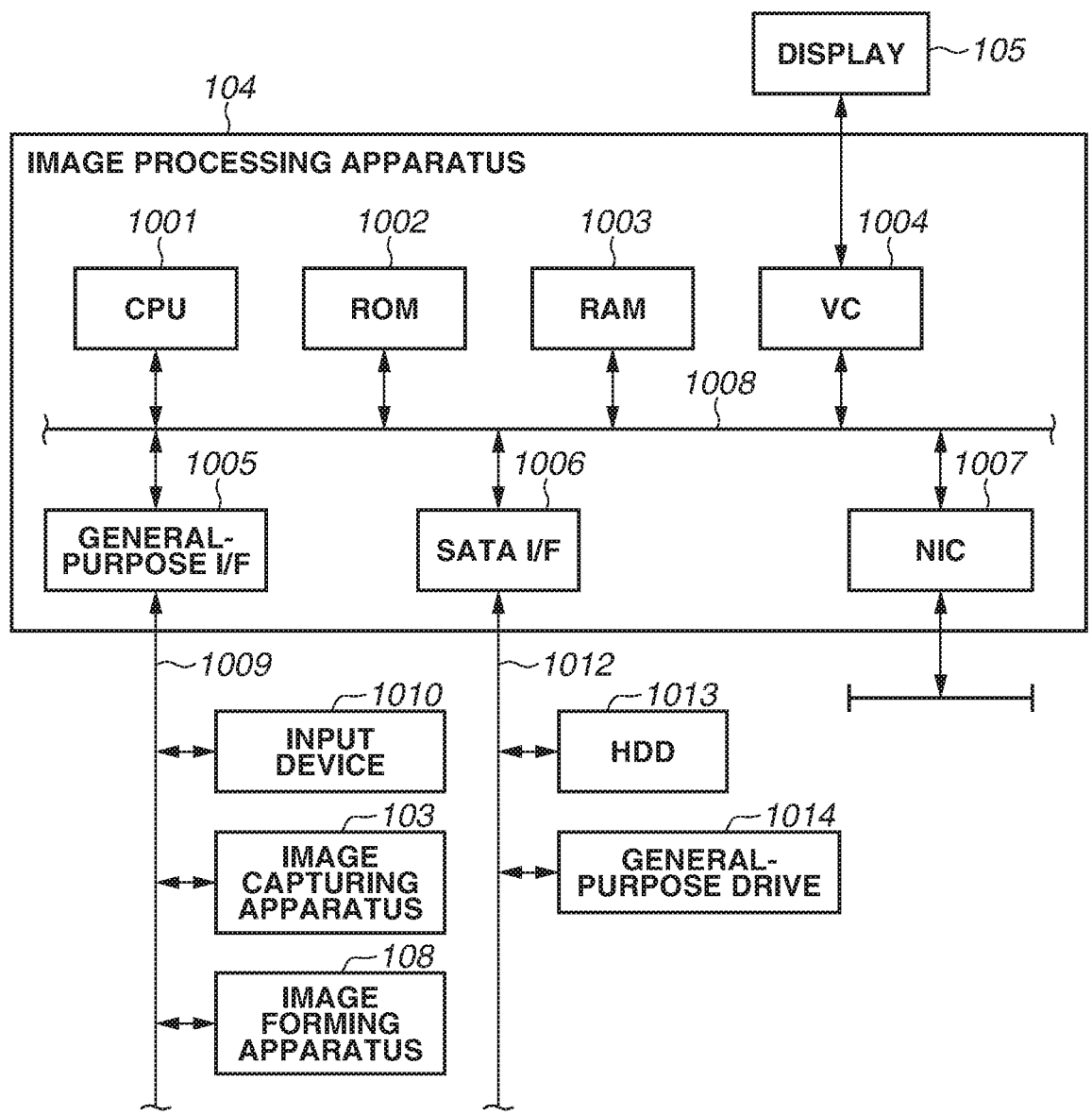
FIGS. 2A and 2B are block diagrams each illustrating a configuration of an image processing apparatus.

FIG. 2A is a block diagram illustrating the hardware configuration of the image processing apparatus 104. The image processing apparatus 104 includes a central processing unit (CPU) 1001, a read-only memory (ROM) 1002, and a random access memory (RAM) 1003. The image processing apparatus 104 further includes a video card (VC) 1004, a general-purpose interface (I/F) 1005, a Serial Advanced Technology Attachment (SATA) I/F 1006, and a network interface card (NIC) 1007. The CPU 1001 executes an operating system (OS) and various programs stored in the ROM 1002, a hard disk drive (HDD) 1013, or the like, by using the RAM 1003 as a work memory. The CPU 1001, which may include one or more processors, one or more memories, circuitry, or a combination thereof, may control each component through a system bus 1008. Processing in flowcharts to be described below may be implemented in such a manner that program code stored in, for example, the ROM 1002, the HDD 1013 is loaded into the RAM 1003 and the loaded program code is executed by the CPU 1001. The display 105 is connected to the VC 1004. An input device 1010, such as the mouse 106 or the keyboard 107, the image capturing apparatus 103, and the image forming apparatus 108 are each connected to the general-purpose I/F 1005 via a serial bus 1009. A general-purpose drive 1014 that performs read or write processing on the HDD 1013 or various recording media is connected to the SATA I/F 1006 via a serial bus 1012. The NIC 1007 inputs and outputs information to and from an external apparatus. The CPU 1001 uses, as a storage location for various data, various recording media mounted on the HDD 1013 or the general-purpose drive 1014. The CPU 1001 displays a user interface (UI) provided by a program on the display 105, and receives input information, such as a user instruction, which is received through the input device 1010.

<Functional Configuration of Image Processing Apparatus 104>

Figure 2B:
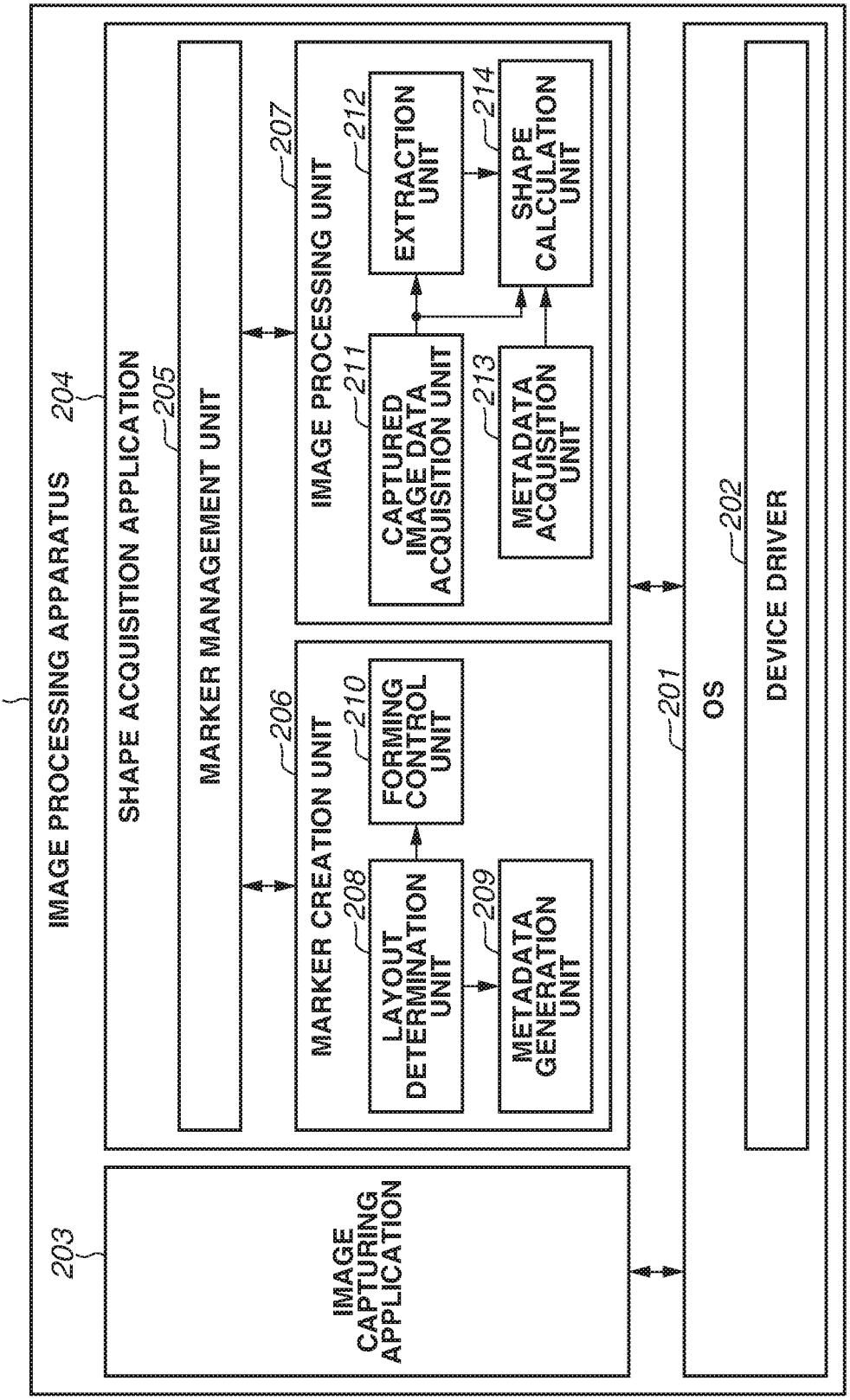

FIG. 2B is a block diagram illustrating the functional configuration of the image processing apparatus 104. An OS 201 is an instruction set for controlling input and output processing and performing start-up, switching, or the like of an application. A device driver 202 is included in the OS 201. The device driver 202 is an instruction set for controlling devices, such as the image capturing apparatus 103, the image forming apparatus 108, the display 105, the mouse 106, and the keyboard 107, which are connected to the image processing apparatus 104. Various applications are capable of controlling these devices by sending a predetermined instruction to the OS 201.

An image capturing application 203 performs image capturing using the image capturing apparatus 103. The image capturing application 203 is an instruction set for implementing a series of operations for storing image data, obtained through image capturing, in the HDD 1013. More specifically, an instruction for changing, for example, an International Organization for Standardization (ISO) sensitivity, a shutter speed, or an aperture value of the image capturing apparatus 103, an image capturing execution instruction, an image data transfer instruction, or the like is transmitted to the OS 201 based on a user instruction input through the mouse 106 or the keyboard 107. The result is then displayed on the display 105.

A shape acquisition application 204 is an instruction set for creating the marker 102, and is also an instruction set for processing a captured image obtained by an image of the marker 102 attached to the surface of the object 101 being captured, and acquiring the shape of the object 101. The shape acquisition application 204 includes a marker management unit 205, a marker creation unit 206, and an image processing unit 207. The marker management unit 205 is an instruction set for managing identification information about the marker 102. The marker creation unit 206 is an instruction set for creating the marker 102. The image processing unit 207 is an instruction set for processing a captured image obtained by an image of the marker 102 attached to the surface of the object 101 being captured, and acquiring the shape of the object 101.

The marker creation unit 206 includes a layout determination unit 208, a metadata generation unit 209, and a forming control unit 210. The layout determination unit 208 determines a layout, such as an arrangement of the mark regions 402 in the marker 102. The metadata generation unit 209 generates metadata to be used for calculating the shape of the object 101 based on the layout determined by the layout determination unit 208. The forming control unit 210 performs control to cause the image forming apparatus 108 to form the marker 102 having the layout determined by the layout determination unit 208 on the base material.

The image processing unit 207 includes a captured image data acquisition unit 211, an extraction unit 212, a metadata acquisition unit 213, and a shape calculation unit 214. The captured image data acquisition unit 211 acquires captured image data obtained by an image of the marker 102 attached to the surface of the object 101 being captured. The extraction unit 212 extracts the ID code region 403 of the marker 102 in the captured image, and reads the identification number of the marker 102. The extraction unit 212 also extracts the mark regions 402 of the marker 102 in the captured image as feature points. The metadata acquisition unit 213 acquires metadata corresponding to the identification number. The shape calculation unit 214 calculates the shape of the object 101 based on the captured image data and the metadata, and generates shape data representing the calculated shape.

<Processing to be Executed by the Image Processing System>

Figure 3:
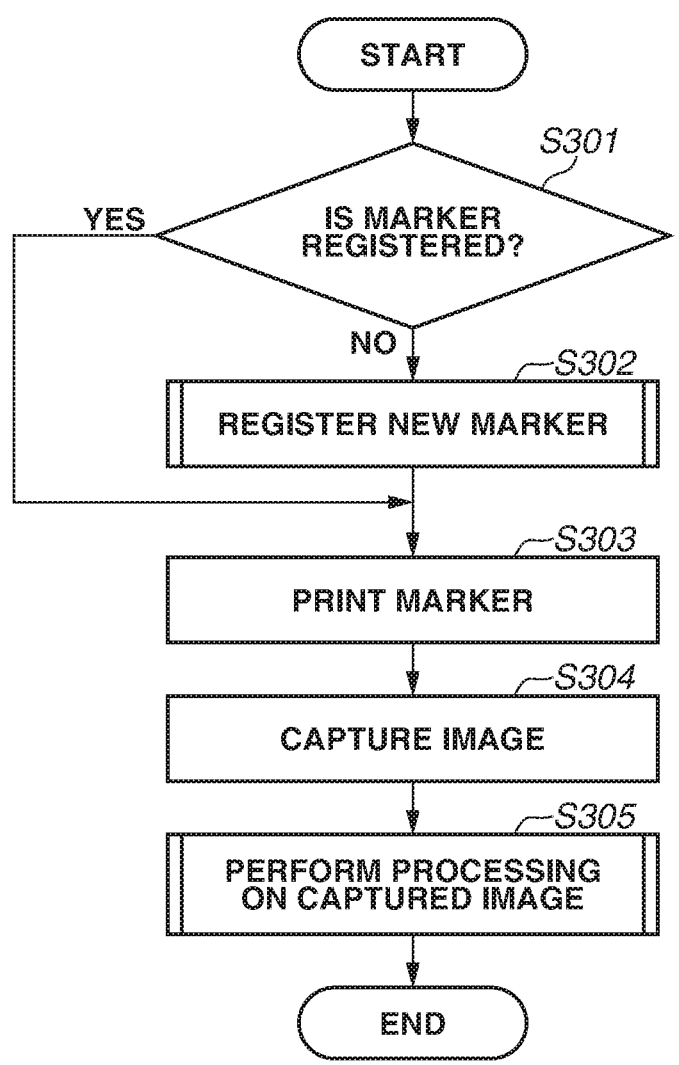
FIG. 3 is a flowchart illustrating processing to be executed by the image processing apparatus.

Processing to be executed by the image processing system according to the present exemplary embodiment will be described with reference to a flowchart illustrated in FIG. 3. Hereinafter, each step (process) is denoted by a reference symbol "S," which is added before a step number.

Figure 5:
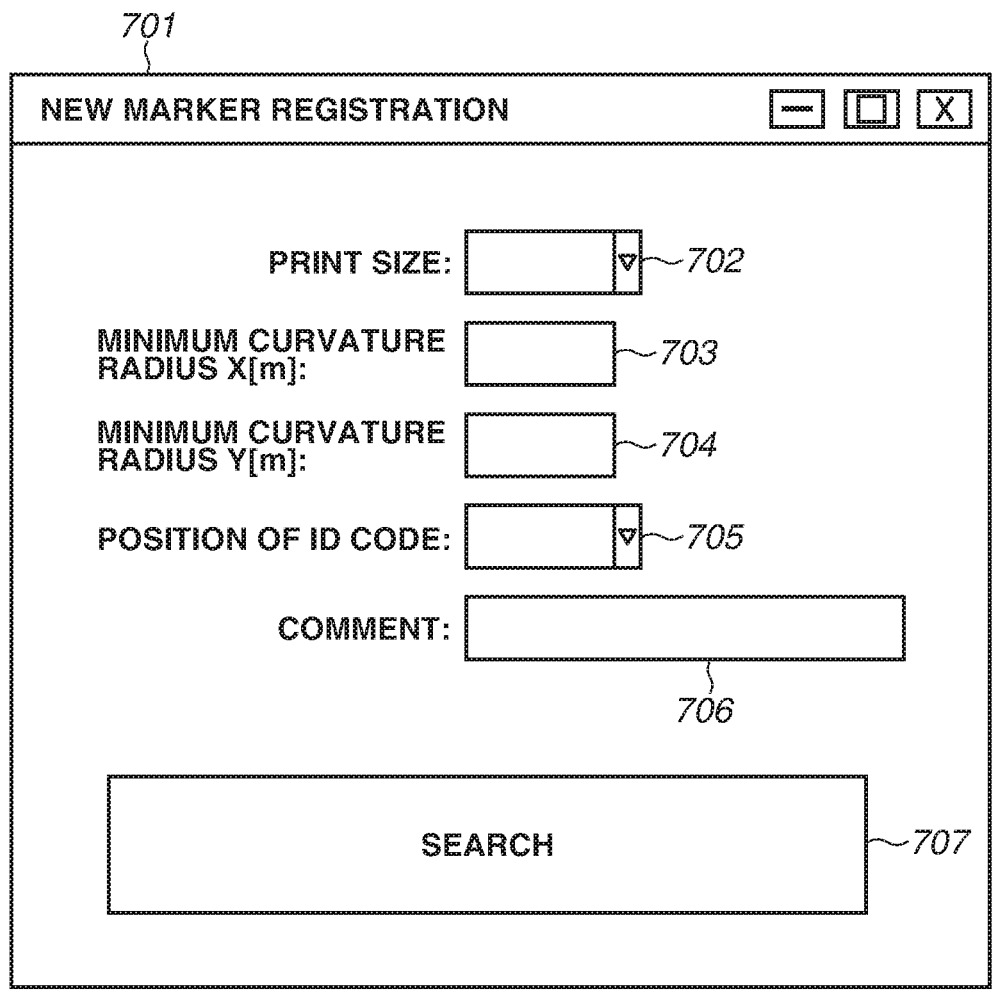
FIG. 5 illustrates an example of a user interface.

In step S301, the marker management unit 205 displays a UI for a user to input information about a marker on the display 105, and searches for the marker based on input information. FIG. 5 illustrates an example of the UI displayed in step S301. In a UI 701, pull-down boxes 702 and 705, text boxes 703, 704, and 706, and a button 707 are arranged. The pull-down box 702 is a region for the user to select the size of a sheet (base material) to be used. In response to the user selecting the pull-down box 702, a list of options for sheet sizes that are available for printing by the image forming apparatus 108 is displayed. Examples of the options for sheet sizes include A5, B5, A4, and B4. In response to the user selecting one of the operations, the selected option is displayed in the pull-down box 702 as the sheet size to be used. The text boxes 703 and 704 are regions for the user to input parameters for determining an interval $\Delta X$ in the lateral direction and an interval $\Delta Y$ in the longitudinal direction, respectively, between the mark regions 402 in the marker 102 illustrated in FIG. 4. In response to the user selecting the text boxes 703 and 704, a cursor is displayed and a value input through the keyboard 107 is also displayed. The parameters input in this case include a value of a curvature radius in a direction-X in which the curvature is minimized and a value of a curvature radius in a direction-Y orthogonal to the direction-X in the region of the object 101 in which the marker is attached. The curvature radius input in this case is a minimum curvature radius with which the shape of the object 101 can be acquired using the marker 102 created based on the input curvature radius. Even for the shape acquisition target having a curvature radius greater than the input curvature radius, the shape of the object 101 can be acquired using the marker 102 creased based on the input curvature radius.

The pull-down box 705 is a region for the user to select the position of the ID code region 403 in the marker 102 illustrated in FIG. 4. In response to the user selecting the pull-down box 705, a list of options for the position is displayed. Examples of the options for the position include up, down, left, and right. In response to the user selecting one of the options, the selected option is displayed in the pull-down box 702 as the position of the ID code region 403. The text box 706 is a region for the user to freely input text, such as comments on the names of parts of the object 101. The button 707 is a button for starting a search for the marker 102. In response to the user selecting the button 707, a marker including registered information close to conditions input in the pull-down box 702 and the text boxes 703 and 704 is searched for from among the markers 102 that have been registered in advance. More specifically, a marker which satisfies such a condition that the same sheet size is set and the registered curvature radius is less than or equal to the curvature radius input in the text boxes 703 and 704 and is closest to the curvature radius input in the text boxes 703 and 704 is searched for. If the marker which satisfies the search condition has been registered (YES in step S301), the processing proceeds to step S303. If the marker which satisfies the search condition has not been registered (NO in step S301), the processing proceeds to step S302.

In step S302, the marker creation unit 206 registers a new marker based on the information input in step S301. The processing in step S302 will be described in detail below. In step S303, the marker creation unit 206 prints the marker 102 on the base material by using the image forming apparatus 108. More specifically, the forming control unit 210 controls the image forming apparatus 108 based on the image data representing the marker to be printed, thereby printing the marker on the base material. In step S304, the image capturing application 203 captures an image of the region of the object 101 to which the marker 102 is attached by using the image capturing apparatus 103, in response to an image capturing instruction from the user. The captured image data obtained through image capturing is sent to the HDD 1013 and stored in the HDD 1013. In step S305, the image processing unit 207 performs processing on the captured image represented by the captured image data stored in step S304, and generates shape data representing the shape of the target region in the object 101. The processing in step S305 will be described in detail below.
<Processing in Step S302>

Figure 6:
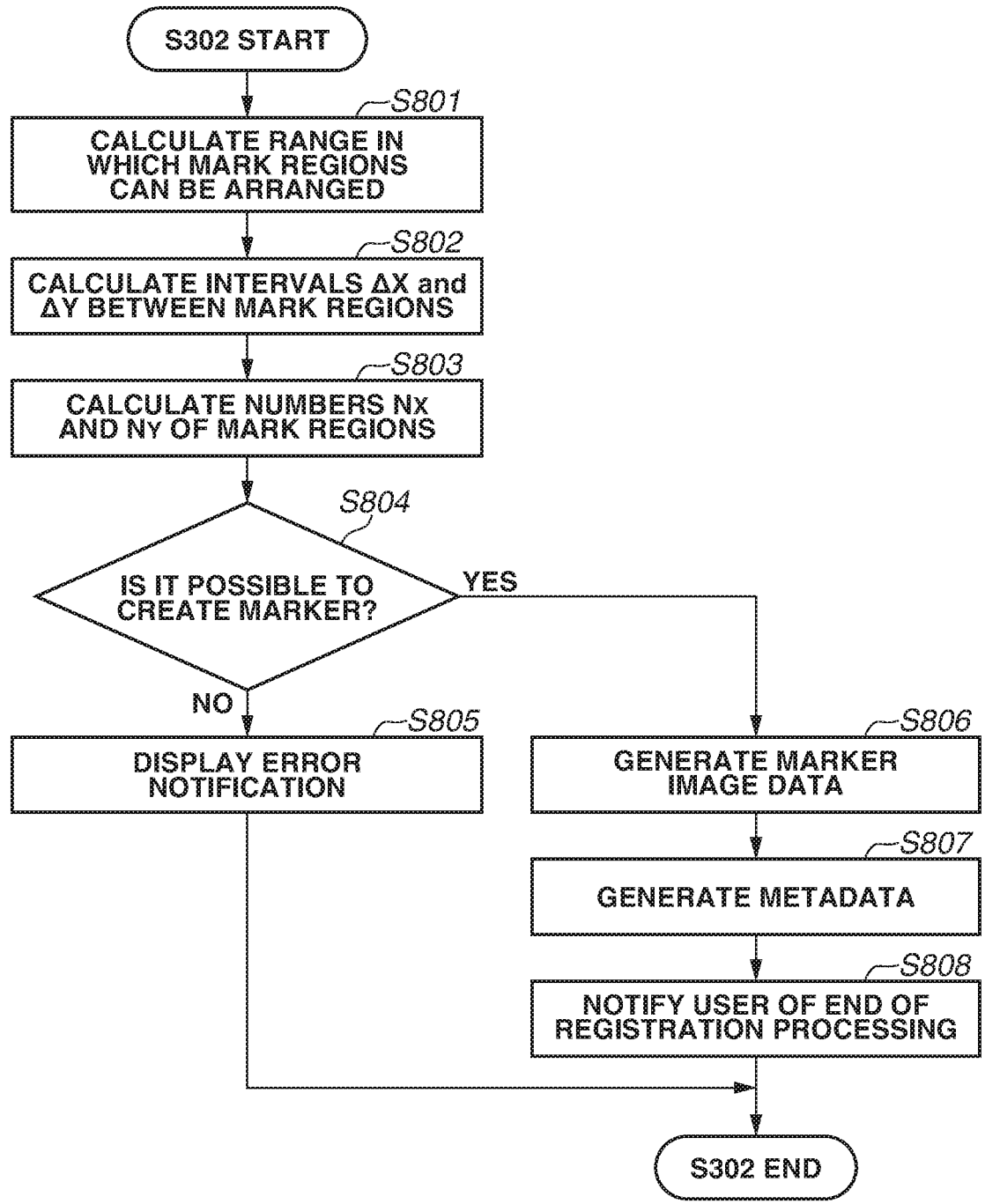
FIG. 6 is a flowchart illustrating processing for registering a new marker.

Processing in step S302 of registering a new marker 102 will be described in detail below with reference to FIG. 6. FIG. 6 is a flowchart illustrating processing for registering a new marker 102.

In step S801, the layout determination unit 208 calculates a range in which the mark regions 402 can be arranged in the marker 102. More specifically, a size obtained by subtracting a print size of the predetermined ID code region 403 and the length of a margin from the sheet size input in the pull-down box 702 is calculated as the range in which the mark regions can be arranged. For example, in a case where "left" is input in the pull-down box 705 and "A4" is input as the sheet size, the lateral length of the range in which the mark regions 402 can be arranged is obtained by calculating the following: the lateral length of A4−(the lateral length of the ID code region 403+2×the length of the margin). The longitudinal length of the range in which the mark regions 402 can be arranged is obtained by calculating the following: the lateral length of A4−2×the length of the margin. Assume herein that the length of the margin corresponds to a distance from an end of the frame region 401 to the mark region 402 or the ID code region 403, and is set to a predetermined value.

In step S802, the layout determination unit 208 calculates the intervals ΔX and ΔY between the mark regions 402. The intervals ΔX and ΔY are determined in such a manner that the difference between the distance of an arc between the mark regions 402 when the marker 102 is attached to the curved surface and the distance of a straight line between the mark regions 402 is smaller than a predetermined threshold Th. More specifically, the interval ΔX is determined so as to satisfy the following Expression (1).

$$R_X \cdot \sin^{-1}(\Delta X / 2R_X) - \Delta X \leq T_h \quad (1)$$

In Expression (1), symbol $R_X$ represents the curvature radius in the X-direction input in the text box 703. The interval ΔY is calculated in a manner similar to the interval ΔX. With the interval between the mark regions 402 having set in such a manner, the interval between the mark regions 402 decreases as the curvature radius of the curved surface decreases. An upper-limit value for each of the intervals ΔX and ΔY is obtained by calculating the following: the range in which the mark regions 402 can be arranged−2×the radius of each mark region 402. In a case where the value of each of the intervals ΔX and ΔY is greater than or equal to the upper-limit value, the upper-limit value is set as each of the intervals ΔX and ΔY.

In step S803, the layout determination unit 208 calculates numbers $N_X$ and $N_Y$ of the mark regions 402 in the X-direction and the Y-direction, respectively. The number $N_X$ is obtained by calculating the following: (the lateral length of the range in which the mark regions 402 can be arranged−2×the radius of each mark region 402)/ΔX, and by rounding off the calculation result and adding one to the number thus obtained. Similarly, the number $N_Y$ is obtained by calculating the following: (the longitudinal length of the range in which the mark regions 402 can be arranged−2×the radius of each mark region 402)/ΔY, and by rounding off the calculation result and adding one to the number thus obtained.

In step S804, the layout determination unit 208 determines whether it is possible to create the marker 102 based on the intervals ΔX and ΔY calculated in step S803. More specifically, it is determined whether the interval ΔX or ΔY is smaller than a value obtained from 2×the radius of each mark region 402+the length of the margin. If the interval ΔX or ΔY is smaller than a value obtained from 2×the radius of the mark region 402+the length of the margin, it is determined that the marker 102 cannot be created (NO in step S804), and then the processing proceeds to step S805. If the interval ΔX or ΔY is greater than or equal to a value obtained from 2×the radius of each mark region 402+the length of the margin, it is determined that the marker 102 can be created (YES in step S804), and then the processing proceeds to step S806. In step S805, the layout determination unit 208 displays an error notification window on the display 105 to notify the user that the marker 102 cannot be created.

In step S806, the layout determination unit 208 generates marker image data for printing the marker 102. More specifically, bitmap data representing an image having a resolution of 600 dpi is first generated with the sheet size input in the pull-down box 702. A pixel value represented by one bit is recorded in each pixel of an image represented by the generated bit map data, and the pixel values of all pixels are initialized with "0," which represents black. Next, the ID code region 403 is drawn on the image represented by the bitmap data at the position designated in the pull-down box 705. In this case, an available number is selected from among ID numbers, and a code image is generated by the selected number being selected, and then the generated code image is drawn as the ID code region 403. Next, a circular mark having a predetermined radius is drawn on the image represented by the bitmap data as each mark region 402. In the region calculated in step S801, $N_X \times N_Y$ circular marks are drawn on the image represented by the bitmap data at the intervals ΔX and ΔY. The image data in which the ID code region 403 and the mark regions 402 are drawn is stored in the HDD 1013 as image data in a general-purpose format, such as a Tagged Image File Format (TIFF).

Figure 7A:
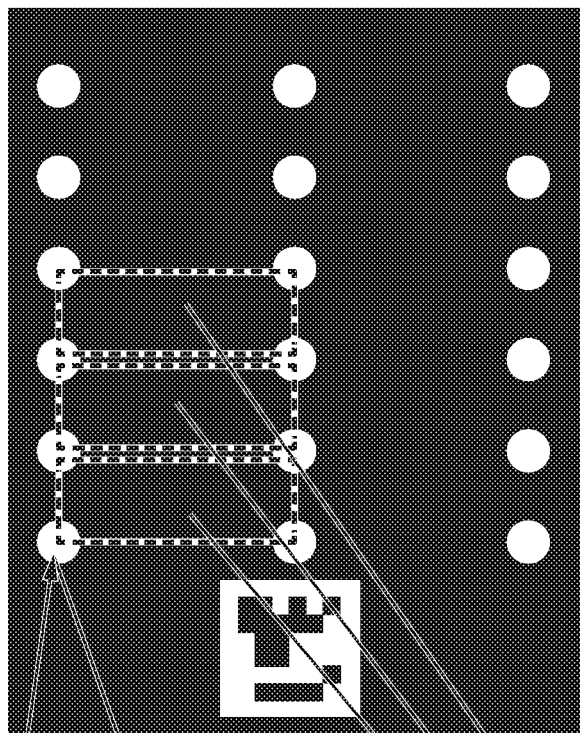
FIGS. 7A and 7B illustrate examples of metadata.
Figure 7B:
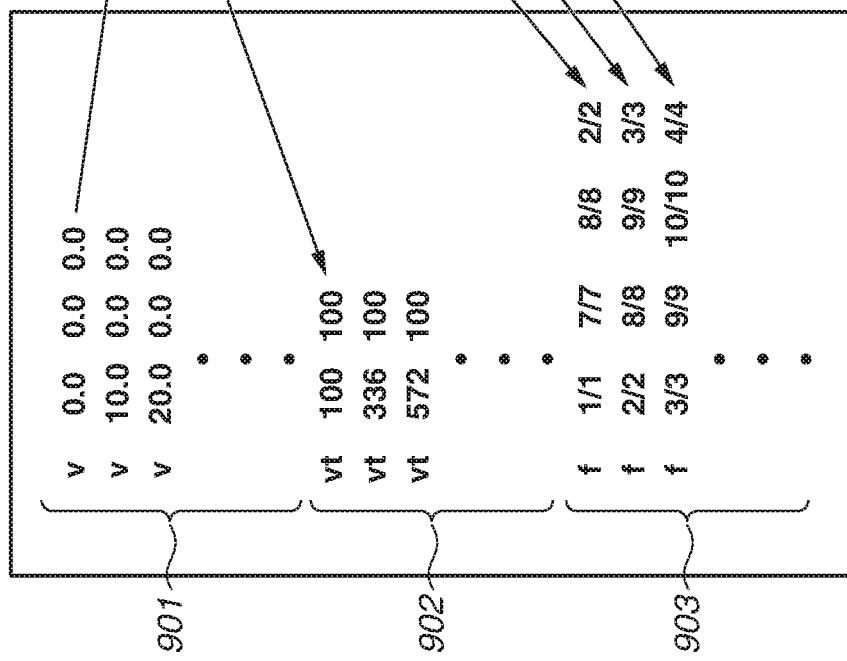

In step S807, the metadata generation unit 209 generates metadata including information about the marker image data generated in step S806. FIGS. 7A and 7B illustrate examples of the metadata. FIG. 7A illustrates information to be recorded in the metadata. In a region 901, three-dimensional coordinate values (X, Y, Z) of the central point of respective mark region 402 on the drawing sheet are recorded in $N_X \times N_Y$ rows. In the coordinate values, a position relative to an origin recorded when the central point of the upper-left mark region 402 is set as the origin. In a region 902, two-dimensional coordinate values (u, v) of the central point of the respective mark region 402 in the marker image generated in step S806 are recorded. As the two-dimensional coordinate values (u, v), $N_X \times N_Y$ rows of two-dimensional coordinate values in a unit of a pixel of the marker image are recorded when the central point of the upper-left mark region 402 is set as the origin. In a region 903, polygon information is recorded. A polygon used in the present exemplary embodiment is a rectangle with the central points of four mark regions 402 as its vertices, as illustrated in FIG. 7B. The polygon information includes each vertex forming the rectangle. More specifically, in the polygon information, row numbers in the region 901 and row numbers in the region 902 corresponding to the four vertices are recorded in each row in the order of counterclockwise rotation around the contour of the rectangle. In step S807, the metadata generation unit 209 adds the information input in the pull-down boxes 702 and 705 and the text boxes 703, 704, and 706 to the generated metadata, and stores the information in the HDD 1013.

In step S808, the layout determination unit 208 displays, on the display 105, a normal termination notification window for notifying the user that a new marker has been registered.

<Process in Step S305>

Figure 8:
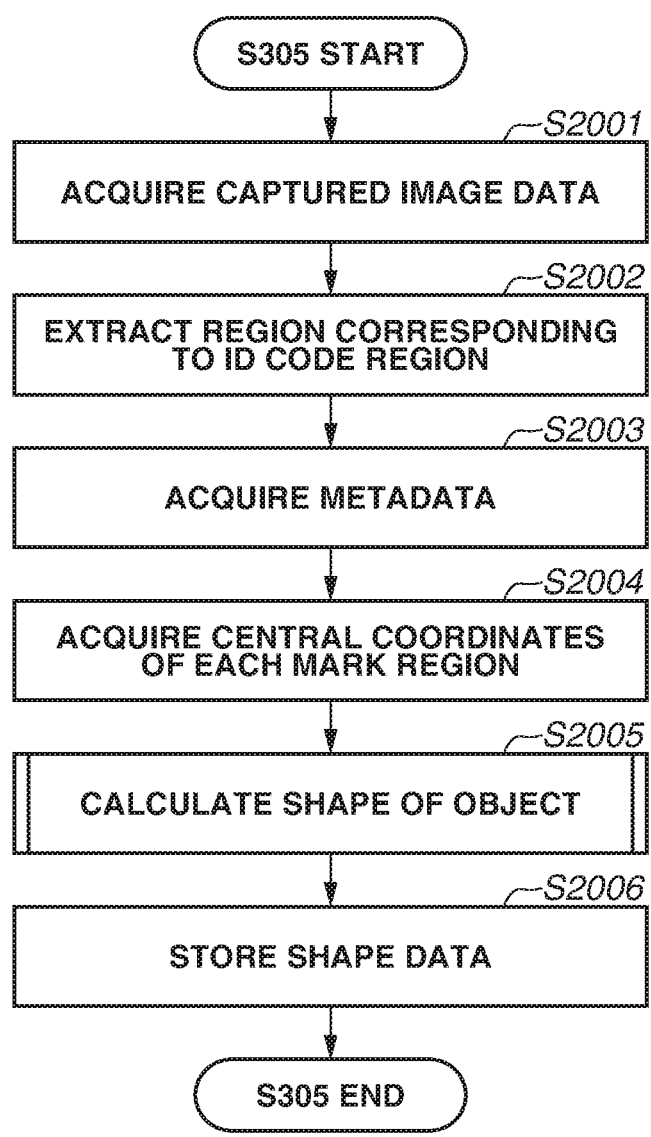
FIG. 8 is a flowchart illustrating processing to be performed on a captured image.

Process in step S305 of calculating the shape of the object 101 will be described in detail below with reference to FIG. 8. FIG. 8 is a flowchart illustrating a process for calculating the shape of the object 101.

In step S2001, the captured image data acquisition unit 211 acquires captured image data obtained by image capturing in step S304. More specifically, a file dialog or the like is displayed on the display 105, and the captured image data is read from the HDD 1013 and is loaded into a main storage device, such as the RAM 1003, in response to a user instruction input with the input device 1010.

In step S2002, the extraction unit 212 extracts the region corresponding to the ID code region 403 in the captured image, and reads the identification number of the marker 102 from the pattern of the extracted region. More specifically, the extraction unit 212 binarizes the pixel values of the captured image. Through this binarization processing, a pixel having a pixel value greater than or equal to a predetermined threshold is set as white and a pixel having a pixel value less than the predetermined threshold is set as black. In the captured image obtained after the binarization processing, edge positions are extracted by using a known Canny edge detection method, and eight neighboring pixels including edge positions are regarded as the same outline and outline extraction processing for grouping the pixels is performed. A quadrangular outline is selected from among a plurality of extracted outline groups, and the outline is modified so that the shape of the ID code region 403 matches the actual shape. An internal pattern of the modified outline is divided into blocks of 8×8 pixels, and the identification number is read based on shading of each block.

In step S2003, the metadata acquisition unit 213 reads the metadata on the marker 102 corresponding to the identification number from the HDD 1013 and loads the metadata into the main storage device such as the RAM 1003.

In step S2004, the extraction unit 212 calculates central coordinates of each mark region 402 based on the captured image data. In this case, the processing up to the line extraction processing is performed as in step S2002, and candidates for circular or elliptical outlines are selected from among the outline groups. An area surrounded by each of the circular or elliptical outlines selected as candidates for the outline is calculated, and the candidates are ranked based on the difference between the calculated area of each outline and the area of the preliminarily set mark region 402. A plurality of outlines corresponding the mark regions 402 that are ranked first to 18th is extracted, and the central coordinate values of the extracted outlines are calculated. The central coordinate values of the respective outlines are sorted in such a manner that a relative positional relationship among the central coordinate values of the respective outlines matches a relative positional relationship among the coordinate values recorded in the region 902. Thus, a correspondence relationship between the rectangle defined in the region 903 in the metadata and the central coordinates of the mark regions 402 in the captured image corresponding to the rectangle can be easily obtained.

Figure 9:
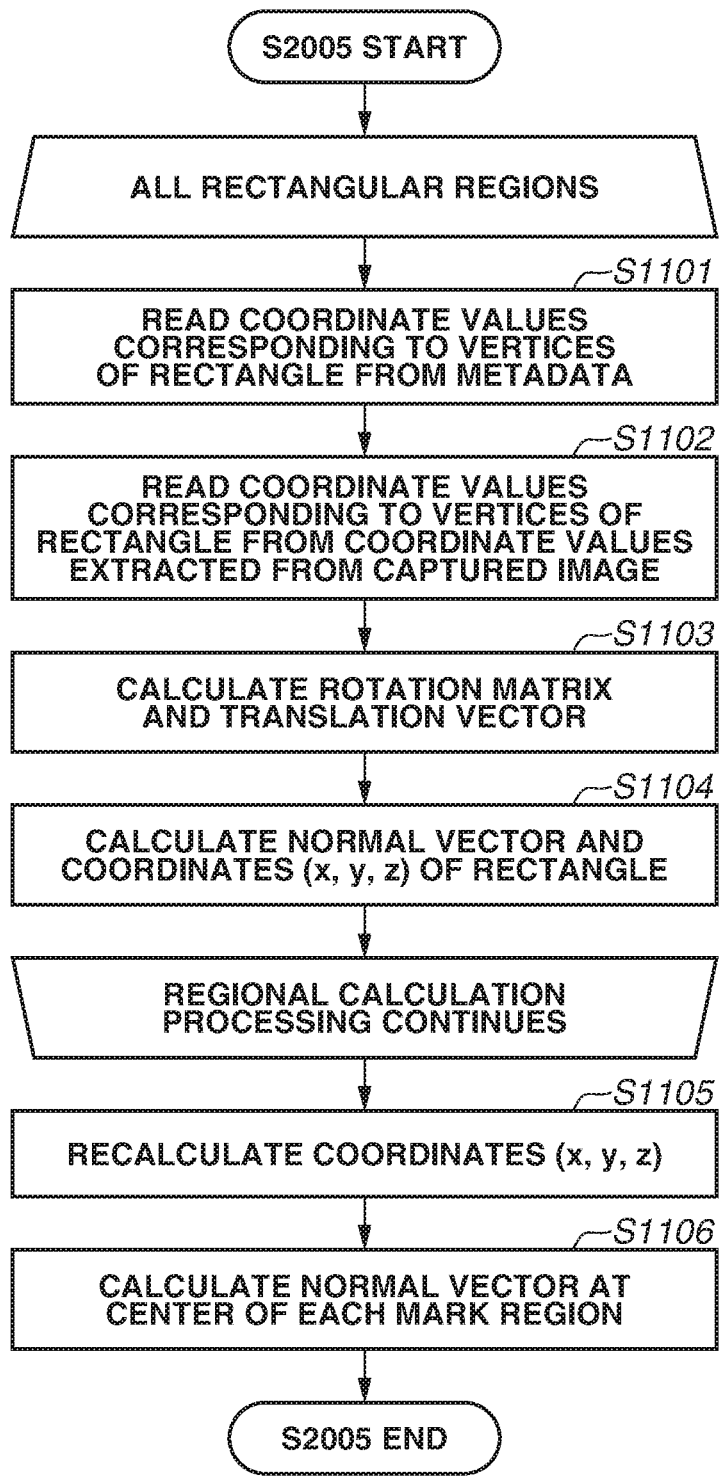
FIG. 9 is a flowchart illustrating processing for calculating a shape of an object.

In step S2005, the shape calculation unit 214 calculates the shape of the object 101 based on the central coordinates calculated by the extraction unit 212 and the metadata. The processing in step S2005 will be described in detail with reference to a flowchart illustrated in FIG. 9.

In step S1101, the shape calculation unit 214 reads the three-dimensional coordinate values (X, Y, Z) of the vertices of the rectangle from the metadata. More specifically, in the metadata, one row is read from the polygon information indicated in the region 903, and the coordinate values corresponding to the respective vertices of the rectangle indicated by the polygon information are read from the region 901.

In step S1102, the shape calculation unit 214 reads the coordinate values corresponding to the respective vertices, the coordinate values of which are read in step S1101, from the central coordinates of the mark regions 402 calculated in step S2004. The central coordinates of the mark regions 402 are sorted in such a manner that the order of the central coordinates of the mark regions 402 matches the order of the coordinate values recorded in the region 902 in step S2004. Accordingly, in step S1102, the central coordinates corresponding to the numbers of the vertices recorded in the region 903 may be extracted, as in step S1101.

In step S1103, the shape calculation unit 214 estimates a rotation matrix R including coefficients $r_{11}$ to $r_{33}$ indicated in Expression (2), and a translation vector "t" including coefficients $t_1$ to $t_3$. This processing enables the calculation of the position and orientation of the image capturing apparatus 103 with respect to the plane of the rectangle.

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} [R \mid T] \begin{bmatrix} X \\ Y \\ Z \\ 1 \end{bmatrix} \quad (2)$$

$$R = \begin{bmatrix} r_{11} & r_{12} & r_{13} \\ r_{21} & r_{22} & r_{23} \\ r_{31} & r_{32} & r_{33} \end{bmatrix}$$

$$t = \begin{bmatrix} t_1 \\ t_2 \\ t_3 \end{bmatrix}$$

In Expression (2), symbols $f_x$ and $f_y$ represent focal lengths in an x-direction and a y-direction, respectively, of the image capturing apparatus 103 in a three-dimensional space, with the position of the image capturing apparatus 103 being set as the origin. Symbols $c_x$ and $c_y$ represent principal point positions in the x-direction and the y-direction, respectively, of the image capturing apparatus 103. Symbols $f_x$, $f_y$, $c_x$, and $c_y$ are held in the HDD 10103 as predetermined values. The coordinates (u, v) in Expression (2) represent the central coordinate values of the mark regions 402 in the captured image that are read in step S1102. The coordinates (X, Y, Z) in Expression (2) are three-dimensional coordinate values that correspond to the coordinates (u, v) and are recorded in the metadata read in step S1101. Symbol "s" represents a scaling factor which is a value obtained by taking a reciprocal of a value that is calculated so that an element in a third row of a three-dimensional vector obtained by calculating the right-hand side of Expression (2) is one. In step S1103, the shape calculation unit 214 estimates the rotation matrix and the translation vector based on the correspondence between the coordinates (u, v) and the coordinates (X, Y, Z) at four vertices of the rectangle. In this estimation method, the rotation matrix and the translation vector is estimated by using the coordinates (u, v) at three or more points and the coordinates (X, Y, Z) corresponding to the coordinates (u, v).

In step S1104, the shape calculation unit 214 calculates three-dimensional coordinates (x, y, z) of the vertices of the rectangle in which the position of the image capturing apparatus 103 is set as the origin, and a normal vector with respect to the plane including the vertices. First, in Expression (3), the three-dimensional coordinates (x, y, z) of the vertices are calculated.

$$\begin{bmatrix} x \\ y \\ z \end{bmatrix} = R \begin{bmatrix} X \\ Y \\ Z \end{bmatrix} + t \quad (3)$$

In Expression (3), symbol "R" represents the rotation matrix calculated in step S1103, and symbol "t" represents the translation vector calculated in step S1103. The coordinates (X, Y, Z) represent the three-dimensional coordinate values of the vertices in the metadata read in step S1101. Next, the shape calculation unit 214 calculates vectors for the coordinates (x, y, z) of other two vertices with the coordinates (x, y, z) of one of the vertices of the rectangle being set as the origin. A unit vector in a direction indicated by the cross product vector of the two calculated vectors is calculated as the normal vector with respect to the surface of the rectangle. In a case where the Z-values in the coordinates (X, Y, Z) of the vertices are the same, the unit vector including components r13, r23, and r33 in the third row of the rotation matrix R may be set as the normal vector.

The shape calculation unit 214 performs the processes in steps S1101 to S1104 described above on the entire region of the rectangle, and acquires the three-dimensional coordinates (x, y, z) of the vertices of each rectangle with the position of the image capturing apparatus 103 being set as the origin. If the rectangles are arranged at an interval where the rectangles can be regarded as a plane, the obtained coordinates can be regarded as the three-dimensional coordinate values of the object 101, even with the object 101 having a curved surface.

In step S1105, the shape calculation unit 214 determines the central three-dimensional coordinates (x, y, z) of the mark regions 402. The vertices of each rectangle calculated in the processing of steps S1101 to S1104 overlap as illustrated in FIG. 7B. Thus, in step S1105, the shape calculation unit 214 recalculates the coordinates (x, y, z) of the overlapping vertices. More specifically, first, in each rectangle, a plane that includes a vertex overlapping the adjacent rectangle and a normal vector with respect to the rectangle is set as a normal is calculated. Next, a straight line passing through the origin and the coordinates of a vertex which does not overlap the adjacent rectangle is calculated, and an intersection between the straight line and the plane is set as coordinates of a new vertex that does not overlap the adjacent rectangle. The recalculation of the coordinate values enables the normal vector to each rectangle to be maintained. An average value of the coordinates (x, y, z) of the overlapping vertices may be set as central three-dimensional coordinate values of the corresponding mark regions 402.

In step S1106, the shape calculation unit 214 calculates a center normal vector in each mark region 402 based on the normal vector calculated for each rectangle. More specifically, an average value of the normal vectors for all rectangles with the center of each mark region 402 being set as a vertex is calculated as the central normal vector of each mark region 402.

Referring again to the flowchart of FIG. 8, in step S2006, the shape calculation unit 214 stores, in the HDD 1013, the central three-dimensional coordinate values of each mark region 402 calculated in step S2005 and the normal vector information as shape data in a predetermined file format. FIG. 10 illustrates an example of the shape data. In a region 1201, the central three-dimensional coordinate values of each mark region 402 are recorded. The coordinates (x, y, z) calculated in step S2005 are recorded in the same order as the order that the mark regions 402 is recorded in the region 901 illustrated in FIG. 7A. In a region 1202, the central coordinate values of each mark region 402 in the marker image are recorded. In a region 1203, the central normal vectors of each mark region 402 are recorded. The central normal vectors of each mark region 402 are recorded in each row in the same order as the order in the region 1201. In a region 1204, polygon information is recorded. While the polygon information is similar to the information displayed in the region 903, to display the correspondence with the normal vector for the region 1203, the row numbers in the region 1201, the row numbers in the region 1202, and the row numbers in the region 1203 are recorded as information about each vertex of the polygon.

Advantages Effects of First Exemplary Embodiment

As described above, the image processing apparatus according to the present exemplary embodiment determines, based on information about the curvature of the surface of the object, the interval between a plurality of marks including features representing the shape of the surface of the object in the marker. Image data is generated based on the determined interval between the marks. Thus, the features can be extracted from the captured image at an interval appropriate for acquiring the shape of the object. The use of the extracted features enables the shape of the object to be acquired with high accuracy. Moreover, since a plurality of marks is arranged in the marker based on the curvature of the surface of the object, there is no need to arrange marks more than necessary, which leads to a reduction in the amount of data. Furthermore, in the calculation of the shape of the object, a higher calculation accuracy can be obtained with a larger interval between marks in the marker in terms of the triangulation principle. According to the present exemplary embodiment, since the interval between marks is determined based on the curvature of the surface of the object, there is no need to arrange the marks at fine intervals more than necessary, and thus, the shape of the object can be calculated with high accuracy.

A second exemplary embodiment of the present disclosure will be described below in detail. In the present exemplary embodiment, processing that enables the user to easily manage the marker will be described. The configuration of the image processing system according to the present exemplary embodiment is similar to that of the first exemplary embodiment, and thus the description thereof is omitted. In the following description, differences between the present exemplary embodiment and the first exemplary embodiment will be mainly described.

<Processing to be Executed by the Image Processing System>

Figure 15:
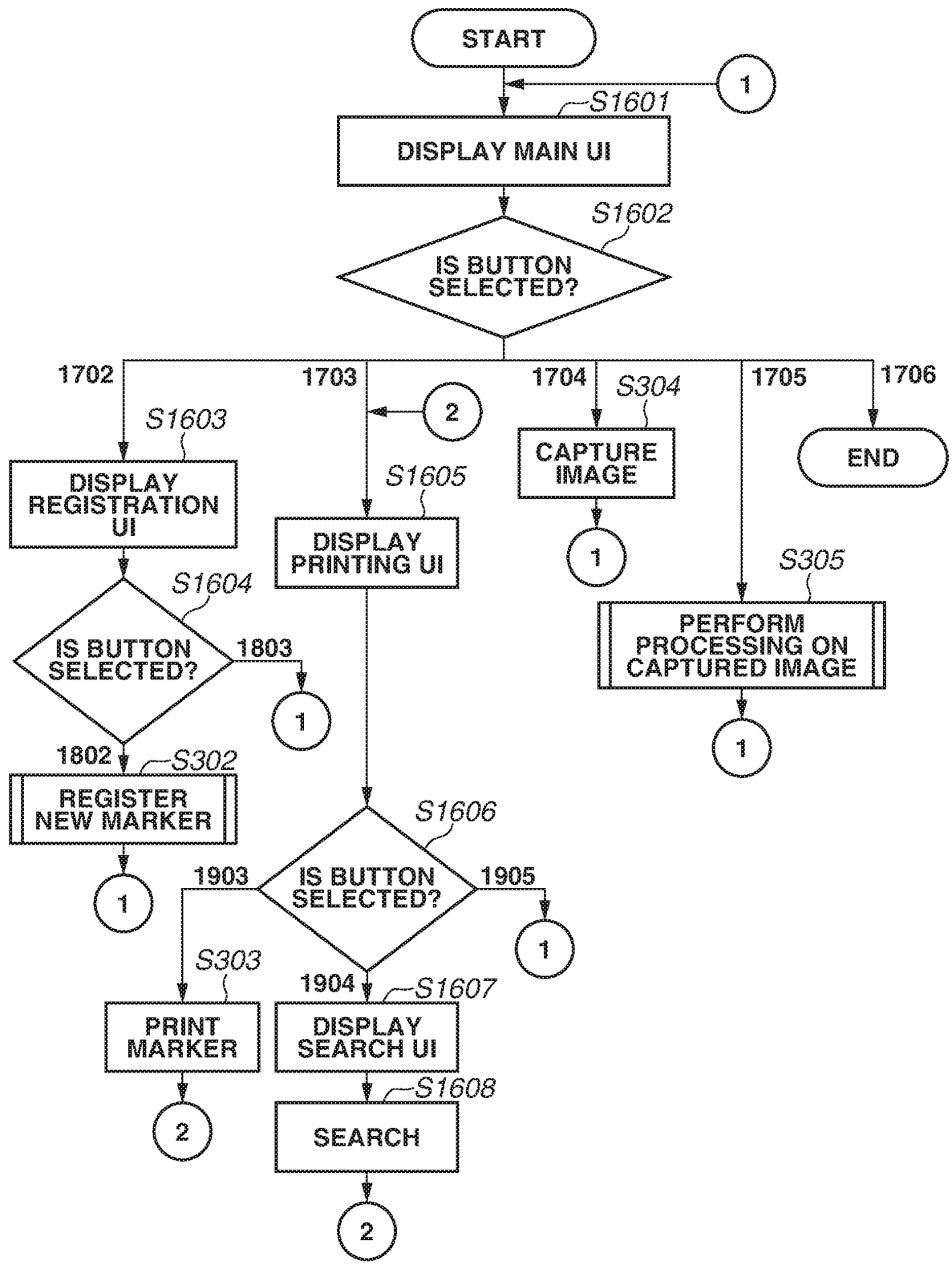
FIG. 15 is a flowchart illustrating processing to be executed by the image processing apparatus.

Processing to be executed by the image processing apparatus 104 in the present exemplary embodiment will be described with reference to a flowchart illustrated in FIG. 15.

Figure 16A:
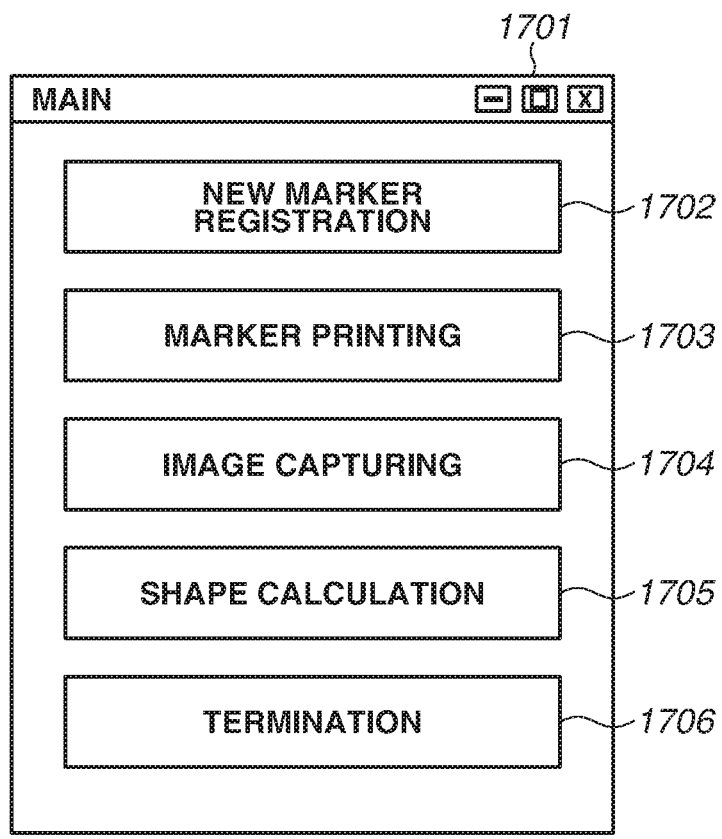
FIGS. 16A and 16B illustrate examples of the user interface.

In step S1601, the marker management unit 205 displays a main UI 1701 illustrated in FIG. 16A on the display 105. In the main UI 1701, a button 1702 is a button for executing processing for registering a new marker, and a button 1703 is a button for executing processing for printing the marker 102. A button 1704 is a button for performing image capturing. A button 1705 is a button for executing processing for calculating the shape of the object 101. A button 1706 is a button for terminating the processing.

In step S1602, the marker management unit 205 shifts the processing to the subsequent step depending on the result of selection by the user. If the button 1702 is selected by the user, the processing proceeds to step S1603. If the button 1703 is selected by the user, the processing proceeds to step S1605. If the button 1704 is selected by the user, the processing proceeds to step S304. If the button 1705 is selected by the user, the processing proceeds to step S305. If the button 1706 is selected by the user, the processing is terminated. The details of processing in steps S302 to S305 are similar to the processing described in the first exemplary embodiment, and thus the descriptions thereof are omitted. After the processing in step S304 or S305 is finished, the processing returns to step S1601 and the main UI 1701 is displayed on the display 105.

Figure 16B:
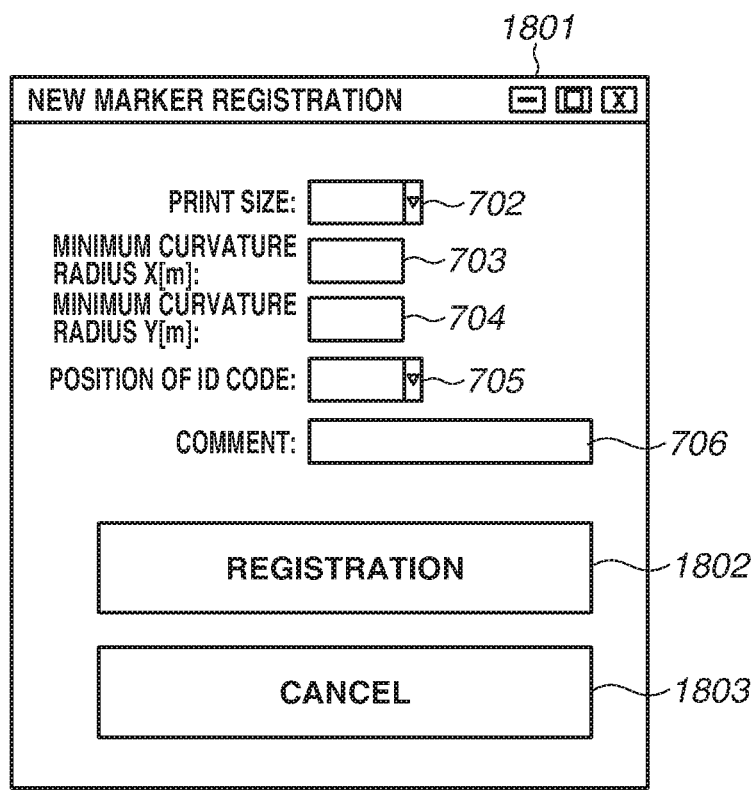

In step S1603, the marker creation unit 206 displays a registration UI 1801 illustrated in FIG. 16B on the display 105. In the registration UI 1801, the pull-down boxes 702 and 705, the text boxes 703, 704, and 706, and buttons 1802 and 1803 are arranged. The pull-down boxes 702 and 705 and the text boxes 703, 704, and 706 include the same functions as those described in the first exemplary embodiment, and thus the descriptions thereof are omitted. In step S1604, the processing of the marker creation unit 206 shifts the processing to the subsequent step depending on the result of selection by the user. If information is input in the pull-down boxes 702 and 705 and the text box 703, 704, and 706 and the button 1802 is selected, the processing proceeds to step S302. After the processing in step S302 is finished, the processing returns to step S1601 and the main UI 1701 is displayed on the display 105. If the button 1803 is selected, the processing returns to step S1601 without the processing in step S303 being performed, and the main UI 1701 is displayed on the display 105.

In step S1605, the marker management unit 205 displays a printing UI 1901 illustrated in FIG. 17A on the display 105. In the printing UI 1901, a list display unit 1902 that displays a list of registered markers 102, and buttons 1903, 1904, and 1905 for executing various types of processing are arranged. On the list display unit 1902, an identification number (ID), a comment on, for example, the names of parts of the object 101, and information about the curvature radius or output size set during registration are displayed for each of the registered markers 102. The list display unit 1902 is provided with a selection field for displaying a selected state. The marker management unit 205 displays a check mark in the selection field in the row selected by the user.

In step S1606, the marker management unit 205 shifts the processing to the subsequent step depending on the result of the selection by the user. If the button 1903 is selected by the user, the processing proceeds to step S303. After the processing for printing the marker 102 for which the check mark is displayed is performed in step S303, the processing returns to step S1605, and the printing UI 1901 is displayed on the display 105. If the button 1904 is selected by the user, the processing proceeds to step S1607. If the button 1905 is selected by the user, the processing returns to step S1601 and the main UI 1701 is displayed on the display 105.

In step S1607, the marker management unit 205 displays a registration UI 2101 illustrated in FIG. 17B on the display 105. In the registration UI 2101, the pull-down boxes 702 and 705, the text boxes 703 and 704, and a button 2102 are arranged. If information is input in the pull-down boxes 702 and 705 and the text boxes 703 and 704 and the button 2102 is selected, the processing proceeds to step S1608.

In step S1608, the marker management unit 205 searches for registered information close to the condition indicated by the information input in the pull-down boxes 702 and 705 and the text boxes 703 and 704. Furthermore, the marker management unit 205 displays a dialog for the searched registered information indicating the identification number and the like on the display 105, and the processing returns to step S1605. The processing described above enables the user to select a row on the list display unit 1902 based on the registered information displayed in the dialog and to print a desired marker 102.

Advantageous Effects of Second Exemplary Embodiment

As described above, the image processing apparatus according to the present exemplary embodiment displays the UI for selecting the marker 102 to be printed from the registered information. Thus, the registered information about the marker 102 can be easily managed and a desired number of markers can be registered, which leads to a reduction in the amount of data to be held in the HDD 1013. Since displaying a list of registered information enables the user to check the type of each part of the target object 101, the possibility of misuse of the marker 102 can be reduced.

A third exemplary embodiment of the present disclosure will be described below. While in the first exemplary embodiment, the arrangement of the mark regions 402 in the marker 102 is determined based on the input curvature radius, in the present exemplary embodiment, the arrangement of the mark regions 402 is selected from among a plurality of predetermined options. The configuration of the image processing system in the present exemplary embodiment is similar to that of the first exemplary embodiment, and thus the description thereof is omitted. In the following description, differences between the present exemplary embodiment and the first exemplary embodiment will be mainly described.

<Marker 102>

Figure 18:
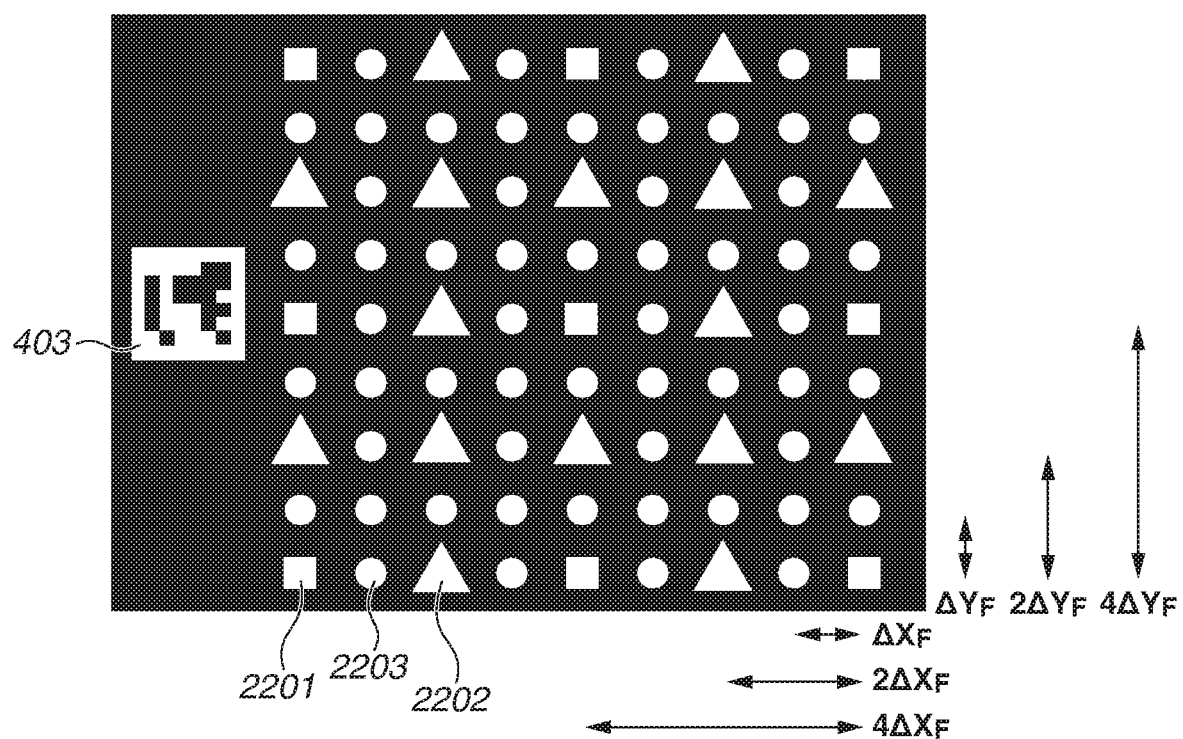
FIG. 18 illustrates an example of the marker.

FIG. 18 illustrates an example of the layout of the marker 102 according to the present exemplary embodiment. The marker 102 includes quadrangular mark regions 2201, triangular mark regions 2202, and circular mark regions 2203. As illustrated in FIG. 18, the mark regions are arranged at an interval $\Delta X_F$ in the lateral direction and at an interval $\Delta Y_F$ in the longitudinal direction. The quadrangular mark regions 2201 or the triangular mark regions 2202 are arranged at an interval $2\Delta X_F$ in the lateral direction and at an interval $2\Delta Y_F$ in the longitudinal direction. The quadrangular mark regions 2201 are arranged at an interval $4\Delta X_F$ in the lateral direction and at an interval $4\Delta Y_F$ in the longitudinal direction. In the present exemplary embodiment, it is determined whether only the quadrangular mark regions 2201, both the quadrangular mark regions 2201 and the triangular mark regions 2202, or all the three types of mark regions are arranged as mark regions in the marker 102, based on the input curvature radius in each direction. FIG. 18 illustrates the layout of the marker 102 in which all the three types of mark regions are arranged as mark regions of the marker 102.

<Processing in Step S302>

Figure 19:
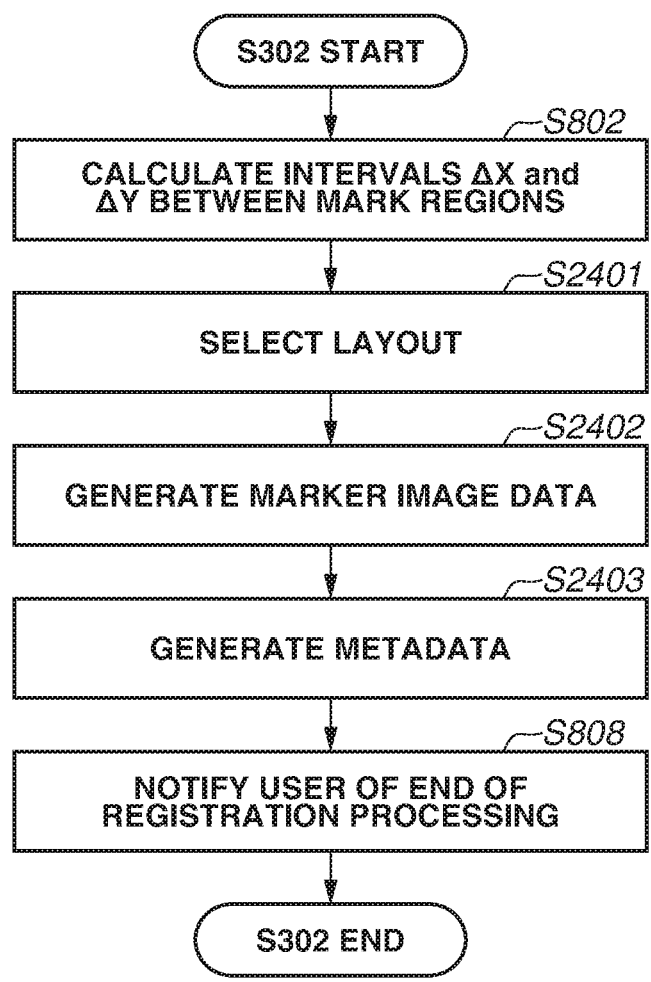
FIG. 19 is a flowchart illustrating processing for registering a new marker.

FIG. 19 is a flowchart illustrating processing in step S302 of registering a new marker 102. First, in step S802, the layout determination unit 208 calculates the intervals ΔX and ΔY between the mark regions as in the first exemplary embodiment. Next, in step S2401, the layout determination unit 208 selects one layout from a plurality of predetermined layouts. More specifically, it is determined whether only the quadrangular mark regions 2201, both the quadrangular mark regions 2201 and the triangular mark regions 2202, or all the three types of mark regions are arranged as the mark regions.

FIGS. 20A to 20I illustrate examples of the layout of the marker 102 determined in step S2401. In step S2401, the layout determination unit 208 determines which one of the layouts illustrated in FIGS. 20A to 20I is used. More specifically, in a case where $\Delta X_F \le \Delta X < 2\Delta X_F$ and $\Delta Y_F \le \Delta Y < 2\Delta Y_F$ hold, the layout illustrated in FIG. 20A in which all the three types of mark regions are arranged as the mark regions is used. In a case where $2\Delta X_F \le \Delta X < 4\Delta X_F$ and $2\Delta Y_F \le \Delta Y < 4\Delta Y_F$ hold, the layout illustrated in FIG. 20E in which the quadrangular mark regions 2201 and the triangular mark regions 2202 are arranged as the mark regions is employed. In a case where $4\Delta X_F \le \Delta X$ and $4\Delta Y_F \le \Delta Y$ hold, the layout illustrated in FIG. 20I in which only the quadrangular mark regions 2201 are arranged as the mark regions is used. In a case where $\Delta X_F \le \Delta X < 2\Delta X_F$ and $2\Delta Y_F \le \Delta Y < 4\Delta Y_F$ hold, the layout illustrated in FIG. 20D in which rows including only the quadrangular mark regions 2201 and the triangular mark regions 2202 as the mark regions is used. Similarly, in a case where $2\Delta X_F \le \Delta X < 4\Delta X_F$ and $\Delta Y_F \le \Delta Y < 2\Delta Y_F$ hold, the layout illustrated in FIG. 20B is used. In a case where $4\Delta X_F \le \Delta X$ and $\Delta Y_F \le \Delta Y < 2\Delta Y_F$ hold, the layout illustrated in FIG. 20C is used. In a case where $4\Delta X_F \le \Delta X$ and $2\Delta Y_F \le \Delta Y < 4\Delta Y_F$ hold, the layout illustrated in FIG. 20F is used. In a case where $\Delta X_F \le \Delta X < 2\Delta X_F$ and $4\Delta Y_F \le \Delta Y$ hold, the layout illustrated in FIG. 20G is used. In a case where $2\Delta X_F \le \Delta X < 4\Delta X_F$ and $4\Delta Y_F \le \Delta Y$ hold, the layout illustrated in FIG. 20H is used.

Next, in step S2402, the layout determination unit 208 generates marker image data based on the layout determined in step S2401, and stores the marker image data in the HDD 1013, as in step S806 of the first exemplary embodiment. In step S2403, the metadata generation unit 209 generates metadata. In the processing, a plurality of pieces of metadata each corresponding to a different one of the nine types of layouts illustrated in FIGS. 20A to 20I is preliminarily generated, and the metadata corresponding to the layout determined in step S2401 is selected. A duplicate of the selected metadata is stored in the HDD 1013. In step S808, the layout determination unit 208 notifies the user that the new marker registration is finished, and then the processing is terminated.

<Processing in Step S305>

The calculation of the shape of the object 101 in step S305 according to the present exemplary embodiment can be made through processing similar to that described in the first exemplary embodiment. However, since the mark regions 402 have different shapes, the processing in step S2004 of calculating the central coordinates of the mark regions 402 may be changed. More specifically, quadrangular, triangular, and circular patterns corresponding to the mark regions 2201 to 2203 are extracted, and the processing is performed by using, for example, a known template matching method with center-of-mass coordinates of the extracted patterns being treated as central coordinates.

Advantageous Effects of Third Exemplary Embodiment

As described above, the image processing apparatus according to the present exemplary embodiment selects the layout of the marker 102 from the predetermined layouts. Thus, the layout of the marker 102 is limited, which facilitates management processing, such as registration and selection processing. Furthermore, for example, there is no need to re-create the layout of the marker 102 for each shape of the object 101, and thus the marker 102 created once can be reused, which leads to a reduction in the cost of printing.

Modified Examples of Third Exemplary Embodiment

While the present exemplary embodiment uses quadrangular, triangular, and circular mark regions as examples of the mark regions, the shape of each mark region is not limited to these examples as long as various types of mark regions can be discriminated. Patterns which have different colors and the same shape, or two-dimensional code patterns, such as Quick Response (QR) Code®, may also be used as the mark regions.

Other Exemplary Embodiment

Figure 11:
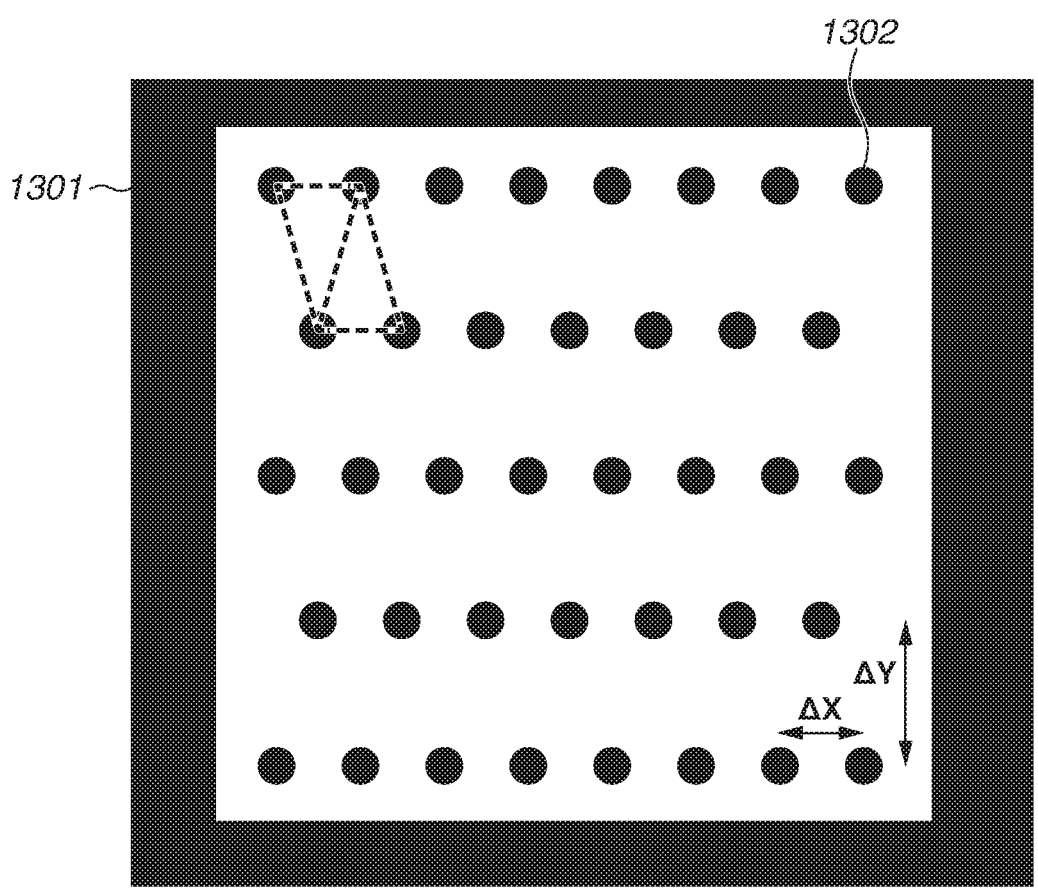
FIG. 11 illustrates an example of a marker.

The marker 102 used in the above-described exemplary embodiments has layouts as illustrated in, for example, FIG. 4. However, the layout of the marker 102 is not limited to the examples described above. FIG. 11 illustrates an example of the marker 102. As illustrated in FIG. 11, the marker 102 does not necessarily include the ID code region 403 as long as the coordinates of the mark regions 402 can be extracted from the captured image. A marker in which the color of each mark region 402 is inverted may also be used. Further, the arrangement of the mark regions 402 is not necessarily limited to the layout illustrated in FIG. 4. Any arrangement may be used as long as three or more mark regions 402 are included and the three-dimensional coordinate values indicated in the region 901 in the metadata are known. For example, as illustrated in FIG. 11, the mark regions 402 may be arranged to be staggered in each row so that the density of the mark regions 402 is uniform regardless of the position. In such a case, the polygon information indicated in the region 903 may be information about a triangle having vertices corresponding to three mark regions 402.

In the above-described exemplary embodiments, the minimum curvature radius for the target region in the object 101 is acquired in each direction and the arrangement of the mark regions 402 is determined based on the acquired minimum curvature radius. However, the method for determining the arrangement of the mark regions 402 is not limited to the example described above. For example, the arrangement of the mark regions 402 may be determined using, for example, drawing information about the object 101. FIGS. 12A and 12B illustrate a method for determining the arrangement of the mark regions 402. In such a case, a curve 1401 and a curve 1402 illustrated in FIGS. 12A and 12B represent a change in the height of the object 101 with a horizontal axis representing an X-coordinate and a vertical axis representing a Z-coordinate (height). A change in the height can be obtained from shape information, such as drawing information. The following description is made assuming that the Z-coordinate does not change in the Y-coordinate direction. In the case of FIG. 12A, an X-coordinate value at which a secondary differentiation for the curve 1401 is zero is first calculated, and the mark region 402 is arranged at the position. Further, the minimum curvature radii on the left side and the right side of the X-coordinate value at which the secondary differentiation is zero are calculated, and the intervals between the mark regions 402 on the left side and the right side of the X-coordinate value are calculated through the same processing as that in step S802. In the case of FIG. 12B, a curvature k of the curve 1402 is first calculated by using Expression (4).

$$k(X) = \frac{Z''(X)}{(1 + Z'(X)^2)^{3/2}} \quad (4)$$

In Expression (4), symbol Z(X) represents the curve 1402 using Z as a function of X. Symbol Z'(X) represents the result of a primary differentiation on Z(X), and symbol Z''(X) represents the result of a secondary differentiation on Z(X). Next, the mark region 402 is arranged at a position where the curvature k is maximum. The mark region arranged first in this case is referred to as a first mark region. Next, the interval from the first mark region to the mark region 402 to be arranged adjacent to the first mark region is determined through the processing in step S802, with the curvature radius at the position where the curvature k is maximum being 1/k. The mark region 402 to be arranged adjacent to the first mark region is referred to as a second mark region. Similarly, the interval from the second mark region to the mark region 402 to be arranged adjacent to the second mark region is determined based on the size of the curvature k at the position of the second mark region. By repeating this processing, the positions of all mark regions 402 can be determined.

In step S305 according to the above-described exemplary embodiment, the image processing unit 207 uses all the mark regions 402 in the marker 102 to calculate the shape of the object 101. However, only some of the mark regions 402 in the marker 102 may be used as mark regions to be used for calculating the shape of the object 101. For example, the mark regions 402 to be used for calculating the shape of the object 101 may be selected using the marker 102 having mark regions arranged at predetermined fine intervals. More specifically, the marker 102 having the layout illustrated in FIG. 20A is printed and is attached to the object 101, and an image of the object 101 to which the marker 102 is attached is captured. The extraction unit 212 selects the shape of each mark region 402 to be used for calculating the shape of the object 101 based on the input curvature radius in the processing in step S2004 of calculating the central coordinates of the mark regions 402. For example, in a case where $4\Delta X_F \leq \Delta X$ and $4\Delta Y_F \leq \Delta Y$ hold for the input curvature radii $\Delta X$ and $\Delta Y$, only the quadrangular mark regions 2201 are extracted as in the layout illustrated in FIG. 20I, and the shape of the object 101 is calculated based on the central coordinates of the extracted mark regions 2201. Through this method, various shapes of the object 101 can be acquired with high accuracy by using only one type of marker 102.

Further, in the above-described exemplary embodiments, the three-dimensional coordinates of the target region in the object 101 are acquired based on the correspondence relationship between the three-dimensional coordinate values of the mark regions 402 recorded in the metadata and the coordinate values of the mark regions 402 extracted in the captured image. Thus, the shape of the object 101 can be easily acquired through one image processing process. However, the method for acquiring the three-dimensional coordinates of the target region in the object 101 is not limited to the example described above. For example, a stereo camera 1501 including a combination of two digital cameras may be used as the image capturing apparatus 103. FIG. 13 illustrates the configuration of the image processing system. In this case, first, the central coordinates of each mark region 402 are calculated based on captured image data obtained by images being captured with the cameras included in the stereo camera 1501. The central coordinates of each mark region 402 are calculated through the same method as that used in the processing in step S2004. The central three-dimensional coordinate values of each mark region 402 are calculated using the principle of triangulation based on the central coordinates of the mark regions 402 corresponding to the pieces of captured image data and a relative positional relationship between the cameras. In this method, there is no need to use the three-dimensional coordinate values of the mark regions 402 recorded in metadata, and the metadata does not necessarily include information recorded in the region 901. Additionally, in such a case, the interval between the mark regions 402 may be smaller than a sufficient interval for approximating the curved surface of the target region. Thus, it is desirable that the mark regions 402 be arranged more densely in a direction in which the curvature radius of the curved surface decreases. The three-dimensional coordinate values may be calculated by images of the object 101 being captured by using one digital camera in a plurality of directions and using a known algorithm, such as Structure from Motion (SfM).

The shape of each mark region 402 used in the above-described exemplary embodiments is a circle. However, the shape of each mark region 402 is not limited to a circle. For example, a triangle may be used as the shape of each mark region 402. For a case where a marker that does not include the ID code region 403 is used, or for a case where a mark region can be discriminated based on the ID code region 403 and the size of the mark region, a quadrangle may be used as the shape of the mark regions 402.

The marker 102 used in the above-described exemplary embodiments is attached to the object 101. However, the marker 102 is not necessarily attached to the object 101 as long as the marker 102 is arranged so that image capturing can be performed based on the shape of the object 101.

The polygon corresponding to the polygon information used in the above-described exemplary embodiments is a rectangle. However, the polygon is not limited to a rectangle. For example, a triangle obtained by a rectangle being halved on a diagonal may be used as the polygon.

In the above-described exemplary embodiments, the interval between the mark regions 402 is determined using the curvature radius of the target region in the object 101. However, the interval between the mark regions 402 may be determined using a curvature instead of the curvature radius.

Further, in the above-described exemplary embodiments, in step S2002, the extraction unit 212 extracts edges by using the Canny edge detection method. However, the edge extraction method is not limited to the example described above. For example, a Sobel filter may be used to extract edges.

Figure 14A:
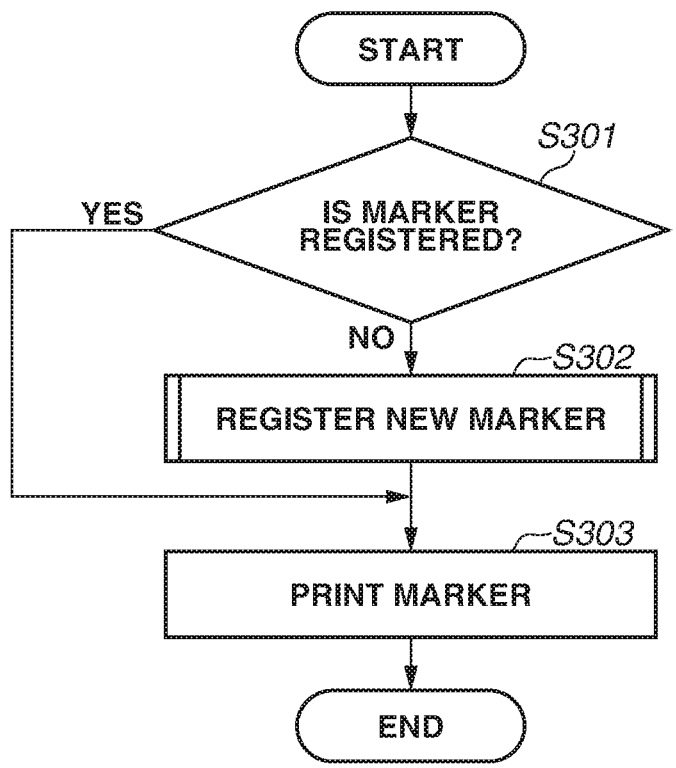
FIGS. 14A and 14B are flowcharts each illustrating processing to be executed by the image processing apparatus.
Figure 14B:
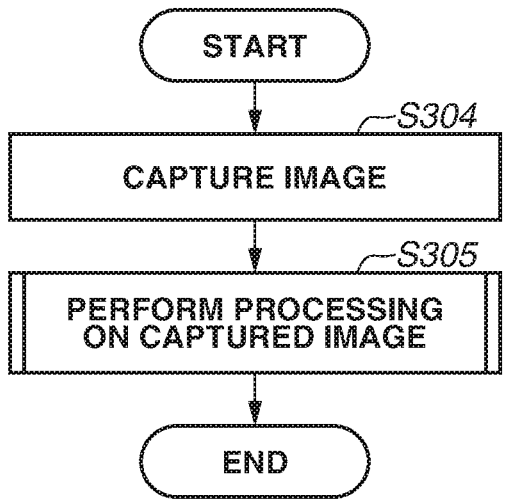

The image processing system according to the above-described exemplary embodiments includes the image capturing apparatus 103, the image processing apparatus 104, and the image forming apparatus 108, but the configuration of the image processing system is not limited to the example described above. For example, the image processing system may include two apparatuses, i.e., the image processing apparatus 104 and the image forming apparatus 108. In such a case, the image processing apparatus 104 performs the processing in steps S301 to S303 described above as illustrated in the flowchart of FIG. 14A. Moreover, the image processing system may include two apparatuses, i.e., the image capturing apparatus 103 and the image processing apparatus 104. In such a case, the image processing apparatus 104 performs the processing in steps S304 and S305 described above as illustrated in the flowchart of FIG. 14B.

According to the present disclosure, it is possible to extract a feature from a captured image at an interval appropriate for acquiring a shape of an object.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

OTHER EMBODIMENTS

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Applications No. 2018-066927, filed Mar. 30, 2018, and No. 2018-230315, filed Dec. 7, 2018, which are each hereby incorporated by reference herein in their entirety.

What is claimed is:

1. An image processing apparatus that generates image data for forming a marker to be arranged on a surface of an object on a base material, the image processing apparatus comprising:
   one or more processors; and
   one or more memories storing instructions, when executed by the one or more processors, causing the image processing apparatus to function as:
   a determination unit configured to determine, based on information about a curvature of the surface of the object, an interval between a plurality of marks, in the marker, the plurality of marks being used for specifying a shape of the surface of the object; and
   a generation unit configured to generate the image data based on the interval between the marks determined by the determination unit,
   wherein the determination unit sets the interval between the marks in a case where the surface of the object has a first curvature to be smaller than the interval between the marks in a case where the surface of the object has a second curvature greater than the first curvature.

2. The image processing apparatus according to claim 1, wherein each of the plurality of marks is a mark for specifying a position of one point in the object.

3. The image processing apparatus according to claim 1, wherein the one or more memories storing instructions, when executed by the one or more processors, causes the image processing apparatus to further function as:
   a registration unit configured to register the image data and information about the marker represented by the image data; and
   a display control unit configured to display a list of pieces of information about the image data and the marker registered by the registration unit.

4. The image processing apparatus according to claim 1, wherein the one or more memories storing instructions, when executed by the one or more processors, causes the image processing apparatus to further function as a forming control unit configured to form the marker on the base material based on the image data.

5. The image processing apparatus according to claim 4, wherein the one or more memories storing instructions, when executed by the one or more processors, causes the image processing apparatus to further function as:
   a captured image data acquisition unit configured to acquire captured image data obtained through image capturing performed in such a manner that the surface of the object on which the marker formed by the forming control unit is arranged and the marker are included in an image capturing range; and an extraction unit configured to extract, as a feature, a pattern included in the marker in a captured image represented by the captured image data.

6. The image processing apparatus according to claim 5, wherein the one or more memories storing instructions, when executed by the one or more processors, causes the image processing apparatus to further function as a generation unit configured to generate shape data representing the shape of the surface of the object based on the feature extracted by the extraction unit.

7. The image processing apparatus according to claim 1, wherein the information about the curvature of the surface of the object includes a value of the curvature or a value of a curvature radius.

8. An image processing method for generating image data for forming a marker to be arranged on a surface of an object on a base material, the image processing method comprising:

determining, based on information about a curvature of the surface of the object, an interval between a plurality of marks, in the marker, the plurality of marks being used for specifying a shape of the surface of the object;
  generating the image data based on the determined interval between the marks; and
  setting, in the determination of the interval, the interval between the marks in a case where the surface of the object has a first curvature to be smaller than the interval between the marks in a case where the surface of the object has a second curvature greater than the first curvature.

9. A non-transitory computer-readable storage medium storing instructions that, when executed by a computer, cause the computer to perform an image processing method for generating image data for forming a marker to be arranged on a surface of an object on a base material, the image processing method comprising:

determining, based on information about a curvature of the surface of the object, an interval between a plurality of marks, in the marker, the plurality of marks being used for specifying a shape of the surface of the object;
  generating the image data based on the determined interval between the marks and
  setting, in the determination of the interval, the interval between the marks in a case where the surface of the object has a first curvature to be smaller than the interval between the marks in a case where the surface of the object has a second curvature greater than the first curvature.

* * * * *